(12) United States Patent
Kim

(10) Patent No.: US 9,604,442 B2
(45) Date of Patent: Mar. 28, 2017

(54) PEELING PROCESS FOR MAKING RESILIENT PAD COMPOSITE

(75) Inventor: Daniel Kim, Busan (KR)

(73) Assignee: APPLIED FT COMPOSITE SOLUTIONS INC., Las Vegas, NV (US)

( * ) Notice: Subject to any disclaimer, the term of this patent is extended or adjusted under 35 U.S.C. 154(b) by 439 days.

(21) Appl. No.: 12/770,403

(22) Filed: Apr. 29, 2010

(65) Prior Publication Data

US 2010/0206472 A1    Aug. 19, 2010

Related U.S. Application Data

(62) Division of application No. 12/624,881, filed on Nov. 24, 2009, now Pat. No. 8,980,412.

(Continued)

(51) Int. Cl.
*B32B 38/10* (2006.01)
*A41D 31/00* (2006.01)
*B32B 3/10* (2006.01)
*B32B 5/18* (2006.01)
*B32B 5/24* (2006.01)

(Continued)

(52) U.S. Cl.
CPC ............ *B32B 38/10* (2013.01); *A41D 31/005* (2013.01); *B32B 3/08* (2013.01); *B32B 3/10* (2013.01); *B32B 3/266* (2013.01); *B32B 5/18* (2013.01); *B32B 5/24* (2013.01); *B32B 7/12* (2013.01); *B32B 9/025* (2013.01); *B32B 25/04* (2013.01); *B32B 25/20* (2013.01); *B32B 27/06* (2013.01); *A63B 71/08* (2013.01); *B32B 37/1207* (2013.01); *B32B 38/0004* (2013.01); *B32B 2038/047* (2013.01); *B32B 2266/025* (2013.01); *B32B 2266/0228* (2013.01); *B32B 2305/18* (2013.01); *B32B 2307/558* (2013.01); *B32B 2437/00* (2013.01); *B32B 2571/00* (2013.01); *Y10T 156/10* (2015.01); *Y10T 156/108* (2015.01); *Y10T 156/1052* (2015.01); *Y10T 156/1074* (2015.01); *Y10T 156/1077* (2015.01); *Y10T 156/1093* (2015.01); *Y10T 428/13* (2015.01); *Y10T 428/24331* (2015.01); *Y10T 428/24802* (2015.01); *Y10T 428/24851* (2015.01)

(58) Field of Classification Search
CPC ..... A63B 71/08; B32B 38/0004; B32B 38/10; B32B 38/04; B32B 3/10; B32B 2305/38; B32B 2437/00; B32B 2437/02; Y10T 156/1052; Y10T 156/1077; Y10T 156/1093; Y10T 156/109; Y10T 156/108
USPC ............ 156/247, 249, 230, 234, 250, 308.4
See application file for complete search history.

(56) References Cited

U.S. PATENT DOCUMENTS 1,922,228 A    8/1933    Brown
2,604,642 A    7/1952    Marco
(Continued)

FOREIGN PATENT DOCUMENTS

CN    1179927 A    4/1998
CN    101135132 A    3/2008
(Continued)

*Primary Examiner* — Christopher Schatz
(74) *Attorney, Agent, or Firm* — Joseph Hyosuk Kim; JHK Law

(57) ABSTRACT

The present application discloses a composite pad structure that includes a substrate bonded to a plurality of discrete, spaced-apart, resilient elements engaged to at least one reinforcing structure.

17 Claims, 21 Drawing Sheets

Related U.S. Application Data

(60) Provisional application No. 61/200,188, filed on Nov. 24, 2008, provisional application No. 61/120,758, filed on Dec. 8, 2008, provisional application No. 61/145,009, filed on Jan. 15, 2009.

(51) Int. Cl.

| | | |
|---|---|---|
| *B32B 7/12* | (2006.01) | |
| *B32B 9/02* | (2006.01) | |
| *B32B 25/04* | (2006.01) | |
| *B32B 25/20* | (2006.01) | |
| *B32B 27/06* | (2006.01) | |
| *B32B 3/08* | (2006.01) | |
| *B32B 3/26* | (2006.01) | |
| *A63B 71/08* | (2006.01) | |
| *B32B 37/12* | (2006.01) | |
| *B32B 38/00* | (2006.01) | |
| *B32B 38/04* | (2006.01) | |

(56) References Cited

U.S. PATENT DOCUMENTS

| | | |
|---|---|---|
| 2,775,998 A | 1/1957 | Obsorn |
| 2,815,515 A | 12/1957 | McKinley |
| 3,020,186 A | 2/1962 | Lawrence |
| 3,285,768 A | 11/1966 | Habib |
| 3,310,819 A | 3/1967 | Morrison |
| 3,876,493 A | 4/1975 | Gilmore |
| 4,194,255 A | 3/1980 | Poppe |
| 4,272,850 A | 6/1981 | Rule |
| 4,513,449 A | 4/1985 | Donzis |
| 4,534,354 A | 8/1985 | Bonner, Jr. et al. |
| 4,538,301 A | 9/1985 | Sawatzki et al. |
| 4,686,724 A | 8/1987 | Bedford |
| 4,862,780 A | 9/1989 | Memmott et al. |
| 5,052,053 A | 10/1991 | Peart et al. |
| 5,325,537 A | 7/1994 | Marion |
| 5,360,653 A | 11/1994 | Ackley |
| 5,435,765 A | 7/1995 | Fletcher |
| 5,551,082 A | 9/1996 | Stewart et al. |
| 5,766,720 A | 6/1998 | Yamagishi et al. |
| 5,836,027 A | 11/1998 | Leventhal et al. |
| 5,858,155 A | 1/1999 | Hill et al. |
| 5,902,439 A | 5/1999 | Pike et al. |
| 5,938,875 A | 8/1999 | Jessup et al. |
| 6,018,832 A | 2/2000 | Graebe |
| 6,347,423 B1 | 2/2002 | Stumpf |
| 6,444,078 B1 | 9/2002 | Yoo |
| 6,519,781 B1 | 2/2003 | Berns |
| 6,739,008 B1 | 5/2004 | Kindrick |
| 6,743,325 B1 | 6/2004 | Taylor |
| 6,829,794 B2 | 12/2004 | Lenyo |
| 6,848,136 B2 | 2/2005 | Sonobe |
| 6,854,144 B1 | 2/2005 | Mehring, Jr. |
| 6,969,598 B2 | 11/2005 | Olsen et al. |
| 7,082,623 B2 | 8/2006 | Johnson et al. |
| 7,100,216 B2 | 9/2006 | Matechen et al. |
| 7,235,291 B2 | 6/2007 | Miyazaki et al. |
| 7,428,764 B2 | 9/2008 | Clark |
| 7,992,226 B2 | 8/2011 | Turner |
| 2003/0110567 A1 | 6/2003 | Kawamura et al. |
| 2003/0186025 A1 | 10/2003 | Scott et al. |
| 2005/0170935 A1 | 8/2005 | Manser |
| 2006/0162082 A1 | 7/2006 | Kawahara et al. |
| 2007/0178282 A1 | 8/2007 | Miekka |
| 2008/0075917 A1 | 3/2008 | Park |
| 2008/0113143 A1* | 5/2008 | Taylor ........................... 428/47 |
| 2008/0127424 A1 | 6/2008 | Rawls-Meehan |
| 2008/0282438 A1* | 11/2008 | Boutaghou ..................... 2/16 |
| 2009/0233511 A1 | 9/2009 | Turner |

FOREIGN PATENT DOCUMENTS

| | | |
|---|---|---|
| CN | 100406236 C | 7/2008 |
| EP | 0008960 A2 | 3/1980 |
| EP | 0 083 454 A1 | 7/1983 |
| EP | 2009190 A2 | 12/2008 |
| GB | 2456659 A | 7/2009 |
| JP | 49-125110 | 10/1974 |
| JP | 1974-125110 | 10/1974 |
| JP | 50-135412 | 11/1975 |
| JP | 2002 371421 A | 12/2002 |
| WO | 9733493 | 9/1997 |
| WO | 2006082595 A1 | 8/2006 |
| WO | 2006134079 A1 | 12/2006 |
| WO | WO 01/03530 A1 | 1/2011 |

\* cited by examiner

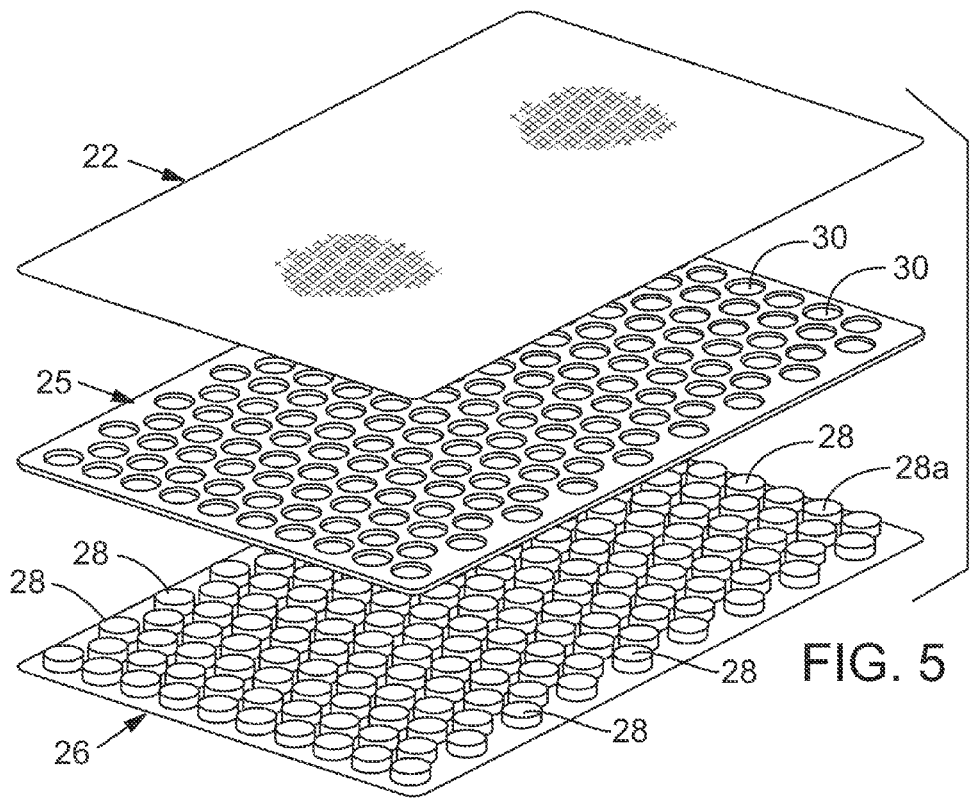
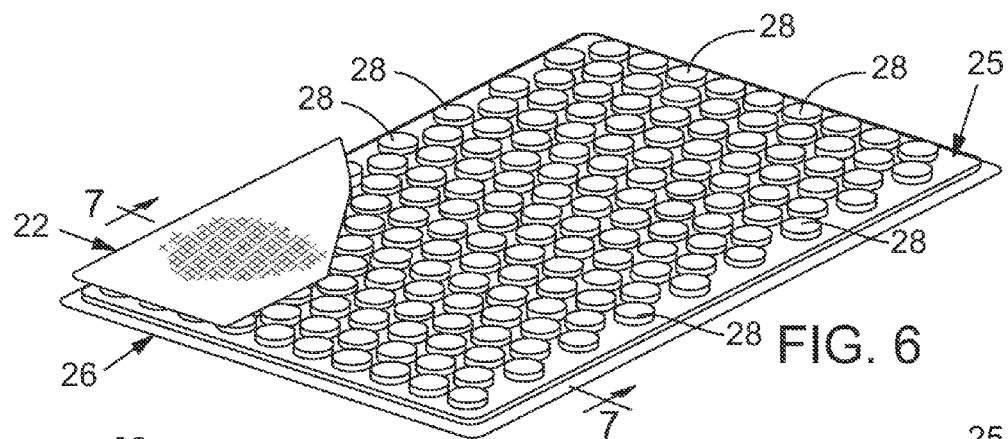
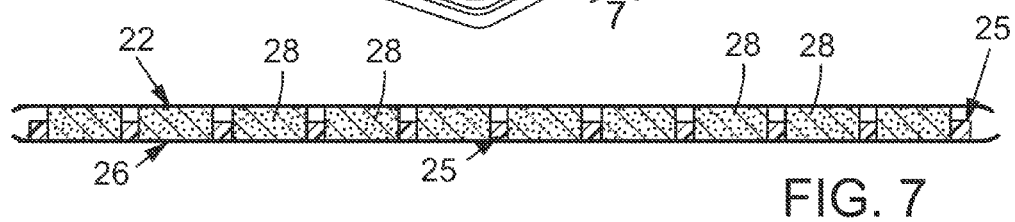

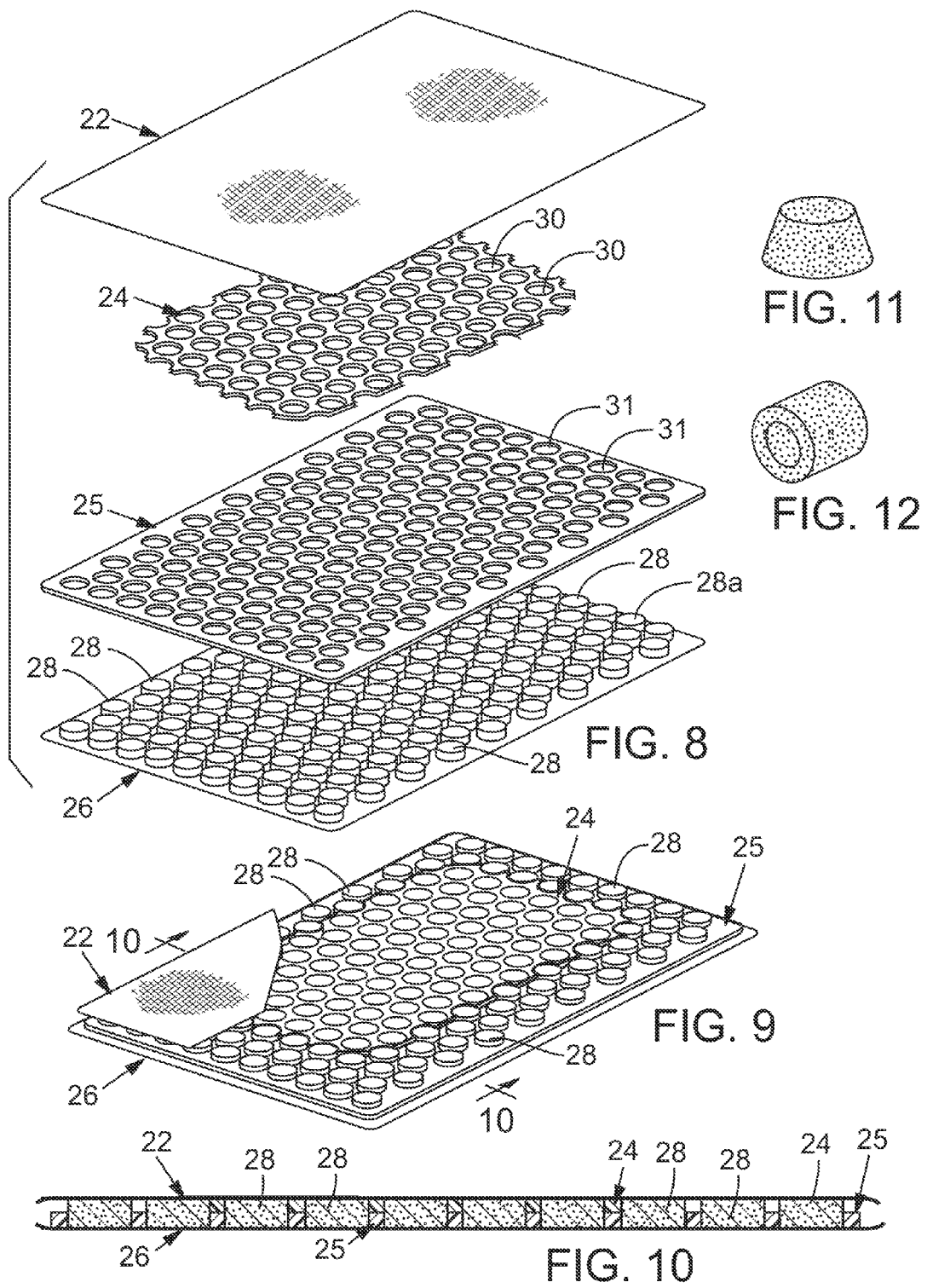

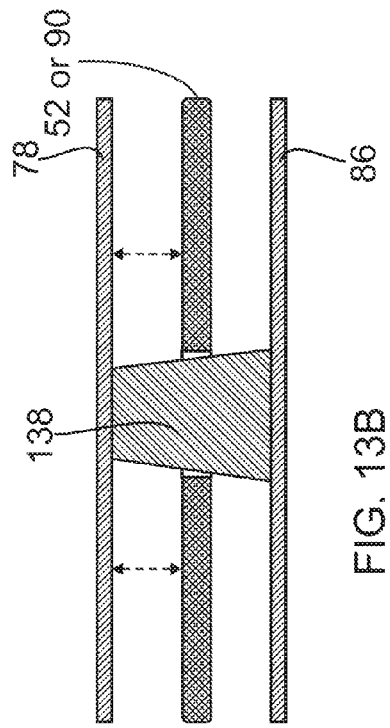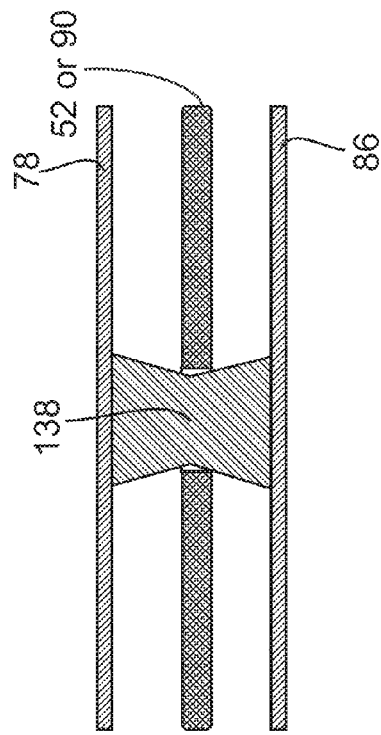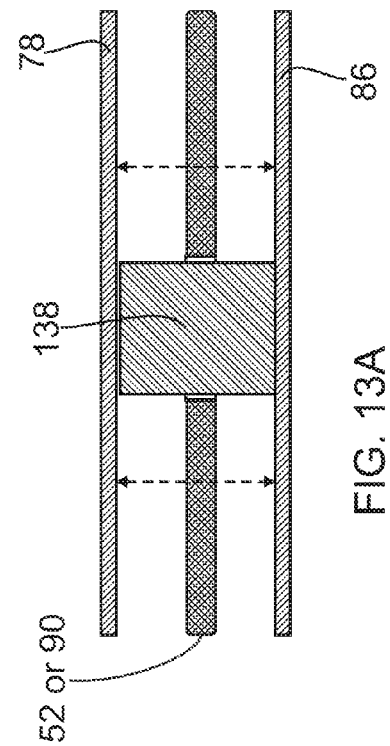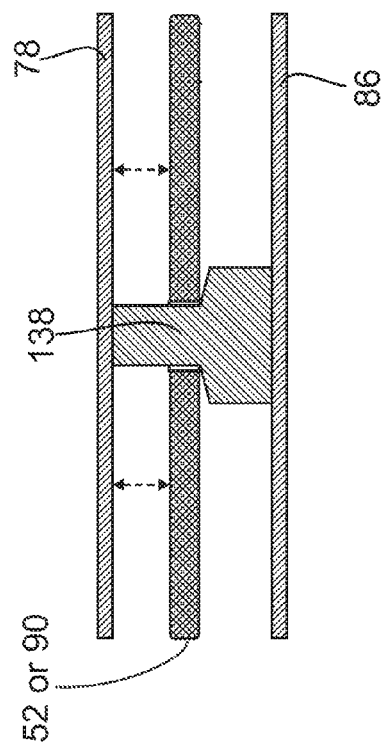

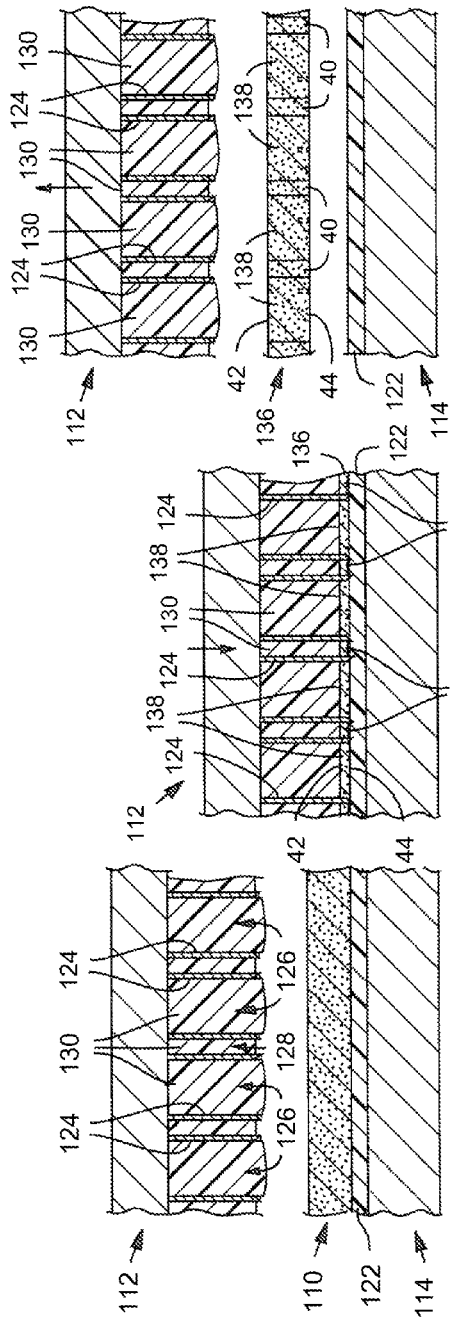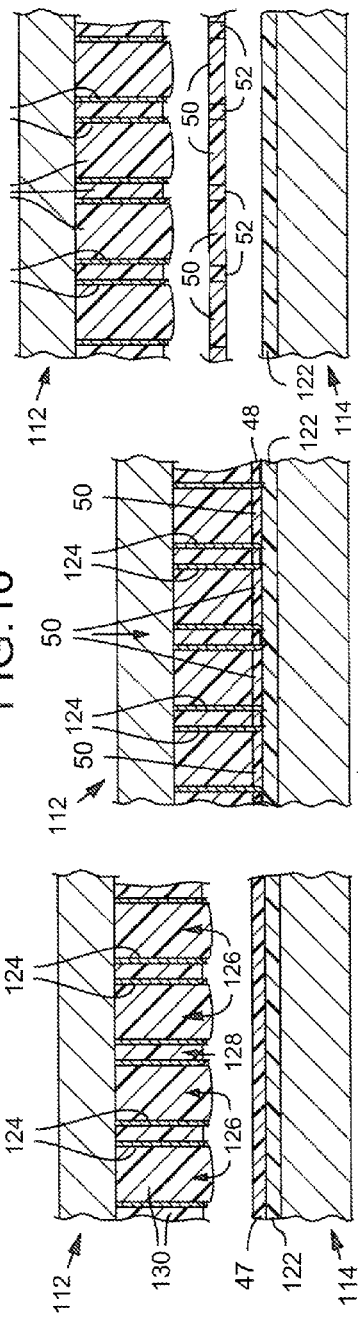

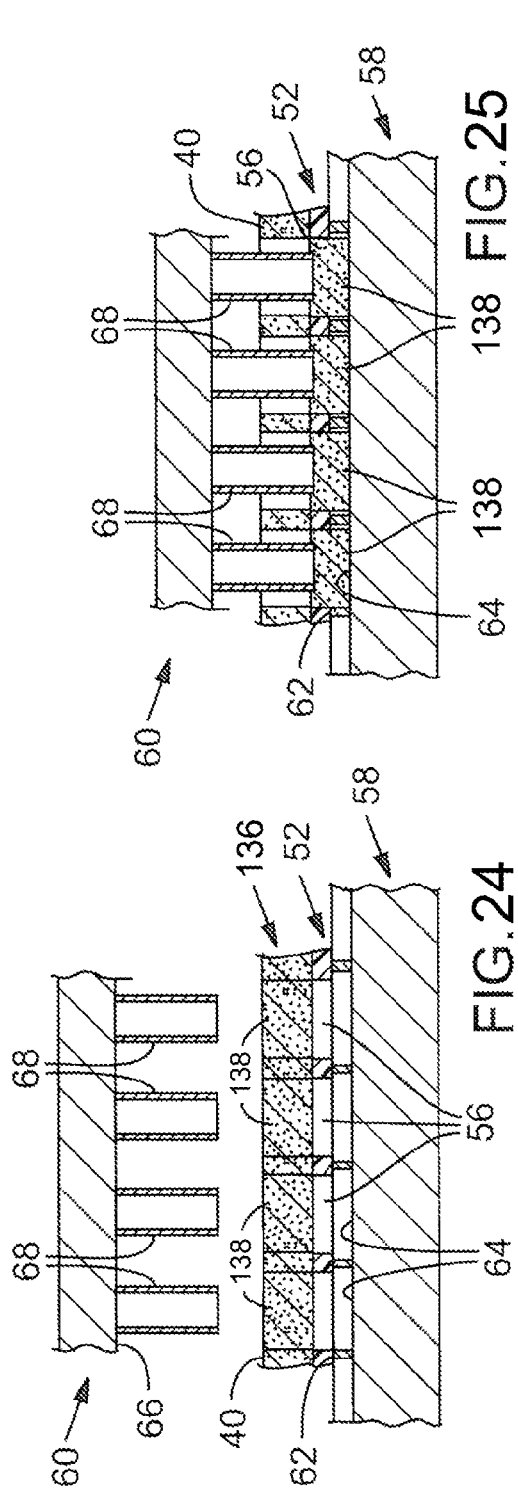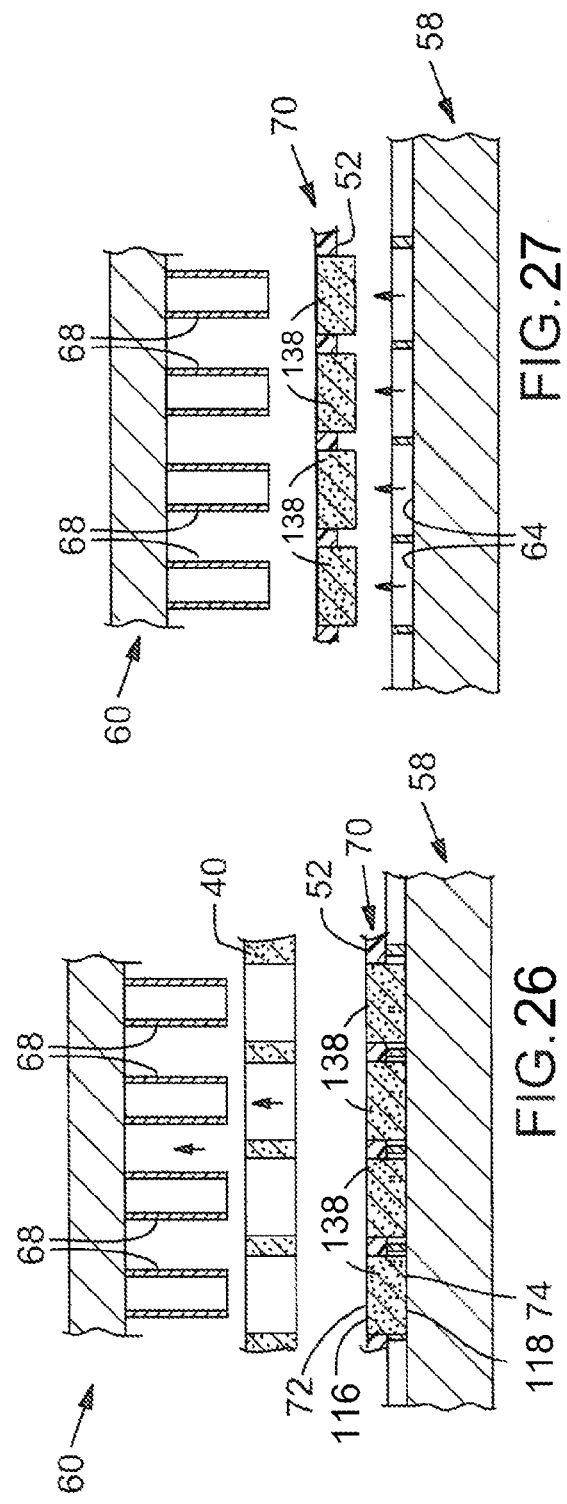

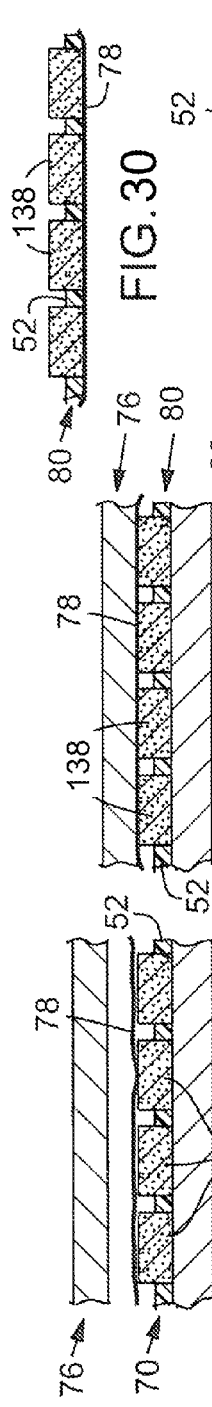

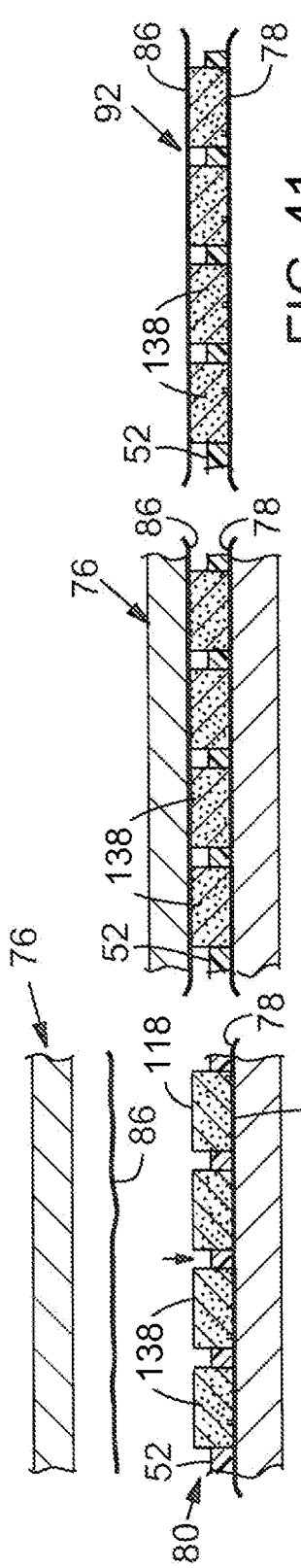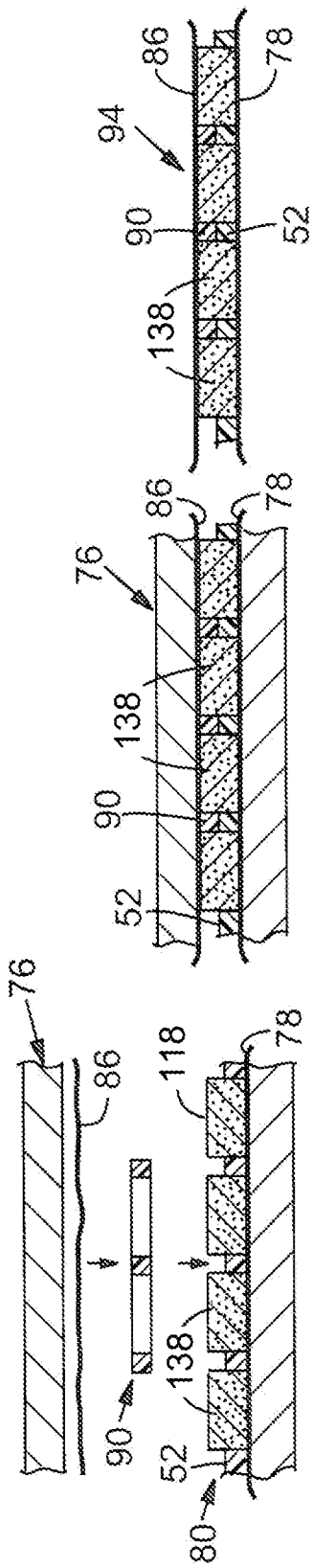

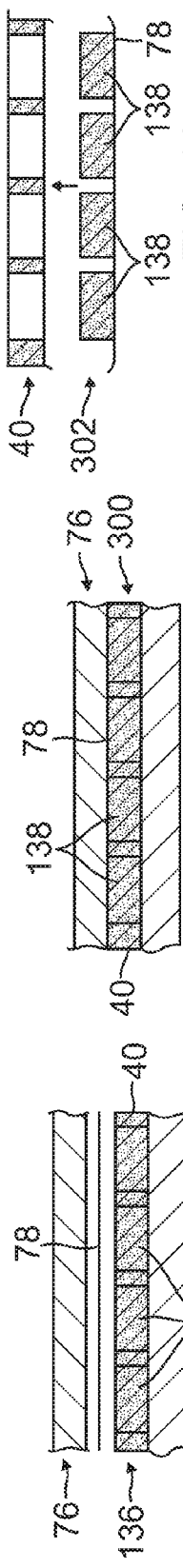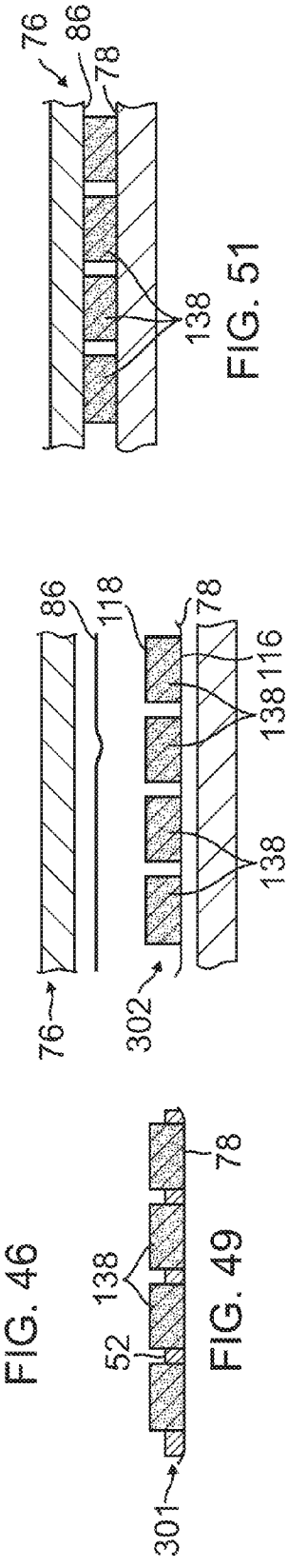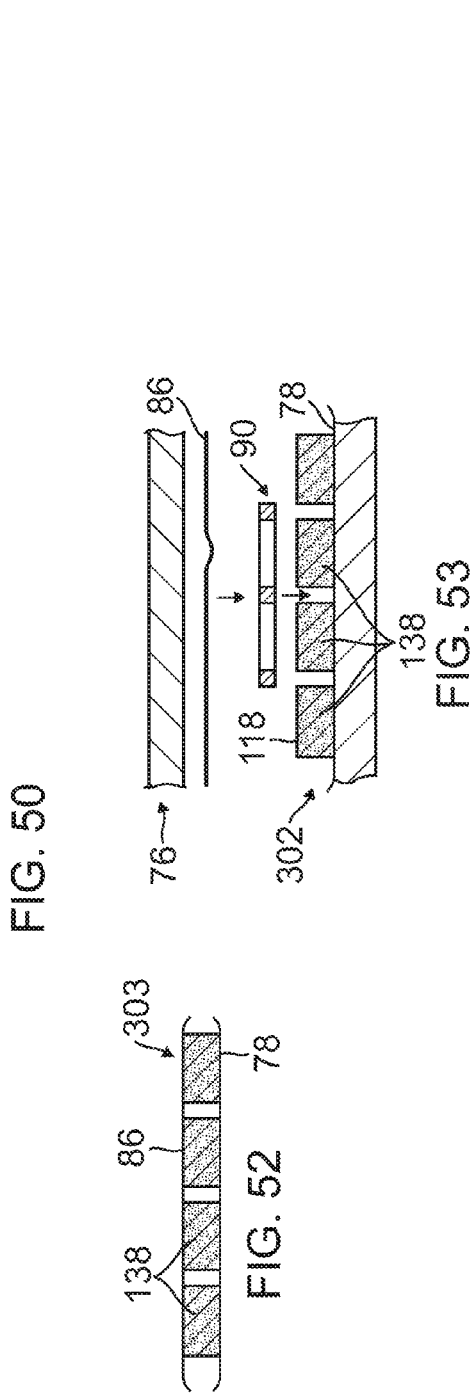

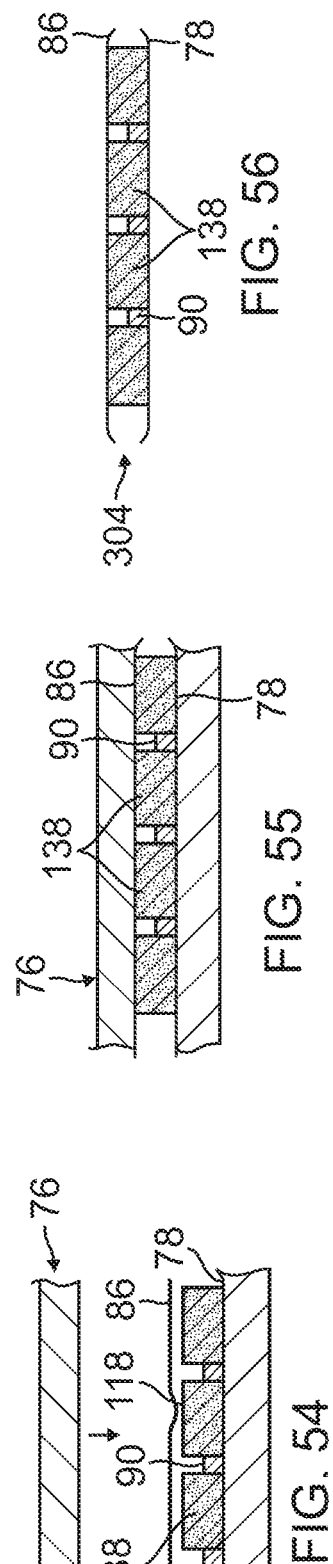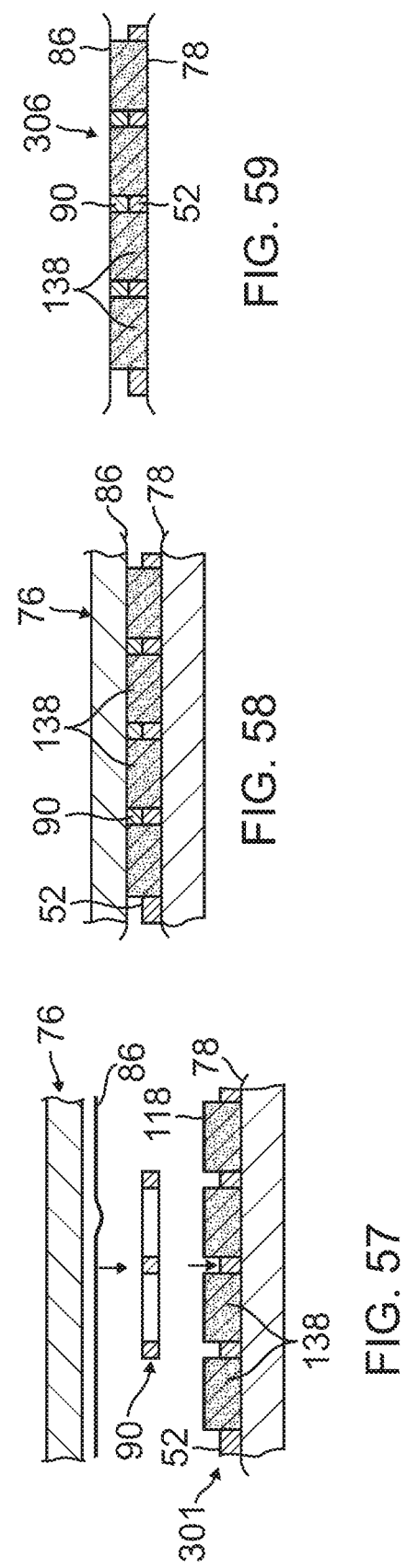

PEELING PROCESS FOR MAKING RESILIENT PAD COMPOSITE

CROSS-REFERENCE TO RELATED APPLICATIONS

The present application is a divisional of U.S. patent application Ser. No. 12/624,881, filed Nov. 24, 2009 now U.S. Pat. No. 8,980,412, which claims the benefit of priority to U.S. Provisional Patent Application Ser. Nos. 61/200,188, filed Nov. 24, 2008, 61/120,758, filed Dec. 8, 2008, and 61/145,009, filed Jan. 15, 2009, the contents of which are incorporated by reference herein in their entirety.

FIELD AND BACKGROUND OF THE INVENTION

The present invention relates to a composite material. The composite material comprises at least one layer of a plurality of discrete, spaced-apart elements and one or more reinforcing structure for surrounding the elements, and at least one layer of sheeting structure contacting either side of the layer that includes the elements and reinforcing structure surrounding the elements. The present invention also relates to methods of making the resilient pad composite.

Protective materials are often used by people to protect themselves from bumps, contusions, cuts, abrasions, and traumatic injury in sports and other activities. The present invention relates to resilient protective materials and methods for producing protective materials for use in products such as shoulder and chest pads, thigh and leg pads, elbow pads, shin guards, helmets, baseball chest protectors, bicycle seats, vehicles seats, chairs, carry bag straps, sports bras, etc. These protective materials may be used as Padding material is typically worn in many sports activities such as baseball, ice hockey, lacrosse, football, basketball and so on. Protection from impact is highly desirable for an athlete. However, protective padding material may be used in applications other than athletic garments. By way of example only, they are desirably used in headgear, body armor, footwear, sacks, padded linings for bags and backpacks, padding on seats, and other uses where light weight, flexible, and breathable shock absorption to protect the body is needed. The advantages of the present technology will be understood more readily after consideration of the drawings and the detailed description of the preferred embodiments.

U.S. Pat. No. 4,513,449 discloses a shock absorbing athletic equipment which absorbs shock by controlled transfer of air from within an enclosure to an outside enclosure. Open-celled foam material is used to act as an exhaustible reservoir of air. However, this patent does not disclose the foam composite padding as disclosed in the present application.

U.S. Pat. No. 6,743,325 discloses a flexible material that includes resilient elements joined to a flexible, stretchable substrate. However, this patent does not disclose any lattice of reinforcing material.

U.S. Pat. No. 7,235,291 discloses an exapandable thermoplastic resin foam which has compressive strength and low flexural modulus of elasticity. However, this patent does not disclose any reinforcing structure to the foam material.

U.S. Pat. No. 5,435,765 discloses a surfboard pad which includes a non-slip padding system. A plurality of pad members are placed on the surfboards. However, there are no reinforcing elements that are used with these surfboard pads.

U.S. Pat. No. 6,519,781 discloses an energy absorbing protective pad for protection of areas of articulation, such as joints of human body. However, no reinforcing structure is disclosed.

U.S. Pat. No. 5,766,720 discloses an elastomer absorber of impact-caused vibrations attached to a part of the device causing the vibration. However, no reinforcing structure is disclosed.

U.S. Pat. No. 5,052,053 discloses an elastic garment for aquatic activities such as a wet suit or dry suit that provides thermal insulation. The garment includes stretch areas having grooves with a depth dimension to increase the elasticity of the garment. However, this patent does not disclose a resilient element surrounded with reinforcing structure.

U.S. Pat. No. 5,836,027 discloses an integrated matrix bedding system which includes an air-foam matrix assembly that has foam elements surrounded by other structures. However, this patent deals with bedding systems, which lies outside of the padding art of the present application.

SUMMARY OF THE INVENTION

In one aspect, the present invention is drawn to a composite pad structure comprising a substrate bonded to a plurality of discrete, spaced-apart, resilient elements engaged to at least one reinforcing structure. The reinforcing structure may include a lattice of reinforcing material. The one or more lattices of reinforcing material may engage at least some of the resilient elements. Optionally, at least one lattice of reinforcing material may engage all of the resilient elements, and additional lattice of reinforcing material engages some of the resilient elements. A second substrate may be bonded on opposite side of the resilient elements. The resilient elements that are engaged to the reinforcing structure may be positioned between the first and second substrates.

In another aspect, the invention is drawn to a garment that includes the composite described above. The garment may be an athletic garment or athletic safety wear, but may include industrial or military equipment such as headgear and body armor. Footwear, sacks, padded linings for bags and backpacks, padding on seats and other uses where light weight, flexible, and breathable shock absorption to protect the body are also contemplated for use with the inventive composite material.

In yet another aspect, the invention is drawn to a method for fabricating a composite structure for use as a resilient cushion, comprising: (i) mounting a plurality of discrete, spaced-apart, resilient elements on a first expanse of material; (ii) engaging at least some of the resilient elements with at least one reinforcing structure; and (iii) mounting a second expanse of material to the resilient elements opposite the first expanse of material to form the composite structure, wherein the at least one reinforcing structure is positioned between the first and second expanses of material in the composite structure.

The step of engaging at least some of the resilient elements with a reinforcing structure includes engaging the resilient elements with a first lattice of reinforcing material and optionally engaging at least some of the resilient elements with a second lattice of reinforcing material. Further, the first and second lattices of reinforcing material may be positioned between the first and second expanses of material in the composite structure. A cutter may be used to cut a sheet of resilient material into a cut sheet of resilient material that includes the plurality of resilient elements and additional resilient material that maintains the plurality of resilient elements in a pattern. The cutter may include a plurality of cutting elements, each defining a space containing a biasing material, wherein after a cutting element has been used to cut a corresponding resilient element, the biasing material may urge the corresponding resilient element away from the space. The step of engaging at least some of the resilient elements with a reinforcing structure may occur before or after the step of mounting the plurality of resilient elements on the first expanse of material. The reinforcing structure may be a lattice of reinforcing material that includes a plurality of holes, and wherein the step of engaging at least some of the resilient elements with a reinforcing structure comprises pushing the plurality of resilient elements out of a cut sheet of resilient material and into the plurality of holes in the lattice of reinforcing material. An adhesive may be used to mount the plurality of resilient elements to either the first expanse of material, the second expanse of material or both the first and second expanse of material. The adhesive may be a heat activated adhesive that is activated by a heat platen.

In still another aspect, the invention is drawn to a method of making a composite structure for use as resilient cushion comprising: (a) providing a sheet of resilient material having opposing sides; (b) applying an adhesive to either or both sides of the sheet of resilient material; (c) providing a cutter having a surface and a plurality of cutting elements extending from the surface in a predetermined pattern; (d) pressing the cutter into the sheet of resilient material, thereby forming a cut sheet of resilient material comprising a plurality of resilient elements and an excess resilient material; (e) withdrawing the cutter from the cut sheet of resilient material; (f) providing a sheet of reinforcing material; (g) pressing the cutter, which need not necessarily be the same cutter used to cut the resilient material, into the sheet of reinforcing material, thereby forming a cut sheet of reinforcing material comprising a plurality of reinforcing elements and one or more lattices of reinforcing material; (h) withdrawing the cutter from the cut sheet of reinforcing material; (i) separating the lattice of reinforcing material from the reinforcing elements, whereby the lattice of reinforcing material is left with a plurality of holes through the reinforcing material where the reinforcing elements used to be; (j) placing the cut sheet of resilient material on top of the lattice of reinforcing material, and aligning the cut sheet of resilient material so that the plurality of resilient elements are positioned above the plurality of holes in the lattice of reinforcing material; (k) providing a pusher having a plurality of push elements that form a pattern corresponding to the pattern of the resilient elements in the cut sheet of resilient material; (l) aligning the plurality of push elements with the plurality of resilient elements, and using the pusher to push the resilient elements out of the cut sheet of resilient material, whereby the plurality of resilient elements are pushed into the plurality of holes in the lattice of reinforcing material, thereby forming a resilient material assembly comprising the plurality of resilient elements at least partially surrounded by at least one lattice of reinforcing material; (m) placing the resilient material assembly next to a heat platen, if heat-activated adhesive material is applied to a side of the resilient material; (n) placing a first sheet of fabric or mesh substrate onto one side of the resilient material assembly, wherein steps (m) and (n) may be optionally reversed in order; and (o) heating the first fabric or mesh sheet substrate with the heat platen to activate the adhesive on the plurality of resilient elements, whereby the first fabric or mesh sheet substrate adheres to the plurality of resilient elements to form the composite material.

The invention is also directed to other embodiments, wherein in step (p), optionally removing the lattice of reinforcing material so as to result in a first fabric or mesh sheet substrate bonded to resilient elements. Alternatively, the sheet of reinforcing material may be pre-cut so as to create several lattices of reinforcing material that may be processed using steps (g) through (o), wherein in the alternative step (p), some of the lattices of reinforcing material may be removed and discarded as waste material, so as to result in a first fabric or mesh sheet substrate bonded to resilient elements, only some of which resilient elements are surrounded by at least one lattice of reinforcing material. Furthermore, as an alternative to steps (g) through (i), the lattice of reinforcement material may be created without the steps employed above and simply cut with by means whereby the lattice of reinforcing material is left with a plurality of holes through the reinforcing material where the reinforcing elements used to be, and combined with the resilient elements so that the holes in the lattice fit around the resilient elements.

The invention is also directed to still other embodiments to include steps (q) placing a second sheet of fabric or mesh substrate onto the opposite side of the resilient material assembly; and (r) heating the second sheet of fabric or mesh substrate with the heat platen to activate the adhesive on the plurality of resilient elements on the opposite side, whereby the second sheet of fabric or mesh substrate adheres to the plurality of resilient elements on the opposite side.

Or, alternatively, the method may include the following steps: (p) placing a second sheet of fabric or mesh substrate onto the opposite side of the resilient material assembly; and (q) heating the second sheet of fabric or mesh substrate with the heat platen to activate the adhesive on the plurality of resilient elements on the opposite side, whereby the second sheet of fabric or mesh substrate adheres to the plurality of resilient elements on the opposite side.

In another aspect, the invention is also drawn to a method of making a composite structure for use as resilient cushion comprising: (a) providing a sheet of resilient material having opposing sides; (b) applying an adhesive to either or both sides of the sheet of resilient material; (c) providing a cutter having a surface and a plurality of cutting elements extending from the surface in a predetermined pattern; (d) pressing the cutter into the sheet of resilient material, thereby forming a cut sheet of resilient material comprising a plurality of resilient elements and excess resilient material; (e) withdrawing the cutter from the cut sheet of resilient material; (f) removing adhesive layer from the excess resilient material on the first side of the cut sheet of resilient material, leaving adhesive layer on the resilient elements; (g) bonding a first fabric or mesh substrate to the first side of the cut sheet of resilient material resulting in bonding between the resilient elements to the first substrate; and (h) separating the excess resilient material from the cut sheet of resilient material, leaving the plurality of resilient elements bound to the first substrate.

The above process may optionally include additional steps (i) placing a second sheet of fabric or mesh substrate onto the second side of the resilient material assembly; and (j) heating the second sheet of fabric or mesh substrate with the heat platen to activate the adhesive on the plurality of resilient elements on the second side, whereby the second sheet of fabric or mesh substrate adheres to the plurality of resilient elements on the second side.

Alternatively, the above process may include additional steps of (i) providing a sheet of reinforcing material; (j) pressing a cutter into the sheet of reinforcing material, thereby forming a cut sheet of reinforcing material comprising a plurality of reinforcing elements and at least one partial or full lattice of reinforcing material (k) withdrawing the cutter from the cut sheet of reinforcing material; (l) separating the lattice of reinforcing material from the reinforcing elements, whereby the lattice of reinforcing material is left with a plurality of holes through the reinforcing material where the reinforcing elements used to be; and (m) engaging at least one partial or full lattice of reinforcing material to the resilient elements in (h).

Optionally, after engaging at least one partial or full lattice of reinforcing material to the resilient elements in (h) as described in step (m), at least one partial lattice of reinforcing material may be removed, leaving at least one partial lattice of reinforcing material engaged to the resilient elements.

Optionally, the above method may include the following additional steps: (n) placing a second sheet of fabric or mesh substrate onto the second side of the resilient material assembly; and (o) heating the second sheet of fabric or mesh substrate with the heat platen to activate the adhesive on the plurality of resilient elements on the second side, whereby the second sheet of fabric or mesh substrate adheres to the plurality of resilient elements to form the composite material, wherein the at least one partial or full lattice of reinforcing material is positioned between the first and second sheets of fabric or mesh substrate.

In another aspect, the invention is also drawn to a method of making a composite structure for use as resilient cushion comprising: (a) providing a sheet of resilient material having opposing sides; (b) applying an adhesive to either or both sides of the sheet of resilient material; (c) providing a cutter having a surface and a plurality of cutting elements extending from the surface in a predetermined pattern; (d) pressing the cutter into the sheet of resilient material, thereby forming a cut sheet of resilient material comprising a plurality of resilient elements and excess resilient material; (e) withdrawing the cutter from the cut sheet of resilient material; (f) covering the excess resilient material with a blocking sheet of a substrate with a pattern so that only the resilient elements are free to bond to any other substrate; (g) bonding a first fabric or mesh substrate to the first side of the cut sheet of resilient material resulting in bonding between the resilient elements to the first substrate; and (h) separating the excess resilient material from the cut sheet of resilient material, leaving the plurality of resilient elements bound to the first substrate.

In yet another aspect, the invention includes a method of making a composite structure for use as resilient cushion comprising: (a) providing a sheet of resilient material having opposing sides; (b) providing a cutter having a surface and a plurality of cutting elements extending from the surface in a predetermined pattern; (c) pressing the cutter into the sheet of resilient material, thereby forming a cut sheet of resilient material comprising a plurality of resilient elements and excess resilient material; (d) withdrawing the cutter from the cut sheet of resilient material; (e) coating resilient elements selectively with adhesive; (f) bonding a first fabric or mesh substrate to the first side of the cut sheet of resilient material resulting in bonding between the resilient elements to the first substrate; and (h) separating the excess resilient material from the cut sheet of resilient material, leaving the plurality of resilient elements bound to the first substrate.

These and other objects of the invention will be more fully understood from the following description of the invention, the referenced drawings attached hereto and the claims appended hereto.

BRIEF DESCRIPTION OF THE DRAWINGS

The present invention will become more fully understood from the detailed description given herein below, and the accompanying drawings which are given by way of illustration only, and thus are not limitative of the present invention, and wherein;

FIG. 5 is an exploded view of the resilient pad assembly, which includes the resilient elements, the full reinforcement lattice and a support.

FIG. 6 is a partial cut away view of the resilient pad assembly, which includes the resilient elements, the full reinforcement lattice and a support.

FIG. 7 is a side view of the resilient pad assembly, which includes the resilient elements, the full reinforcement lattice and a support.

FIG. 8 is an exploded view of the resilient pad assembly, which includes the resilient elements, the full and partial reinforcement lattice and a support.

FIG. 9 is a partial cut away view of the resilient pad assembly, which includes the resilient elements, the full and partial reinforcement lattice and a support.

FIG. 10 is a side view of the resilient pad assembly, which includes the resilient elements, the full and partial reinforcement lattice and a support.

FIG. 11 is an embodiment of the invention where the resilient element is cone shaped.

FIG. 12 is an embodiment of the invention where the resilient element is cored cylinder shaped.

FIGS. 13A-13D is a sectional side view of the resilient pad assembly, where the resilient assembly is surrounded by reinforcement lattice. The resilient element is shaped as A. a cylinder; B. cone; C. a cylinder with a constricted end section; D. a cylinder with constriction near the middle of its body.

FIG. 15 is a sectional side view of a sheet of resilient material positioned beneath a cutter on a work surface.

FIG. 16 is a sectional side view of a cutter cutting a sheet of resilient material on a work surface.

FIG. 17 is a sectional side view of a cut sheet of resilient material positioned between a cutter and a work surface.

FIG. 18 is a sectional side view of a sheet of reinforcing material positioned beneath a cutter on a work surface.

FIG. 19 is a sectional side view of a cutter cutting a sheet of reinforcing material on a work surface.

FIG. 20 is a sectional side view of a cut sheet of reinforcing material positioned between a cutter and a work surface.

FIG. 21 is a sectional side view of reinforcing elements being removed from a cut sheet of reinforcing material to form a lattice of reinforcing material.

FIG. 24 is a sectional side view of a cut sheet of resilient material and a lattice of reinforcing material beneath a pusher on a die.

FIG. 25 is a sectional side view of a pusher pushing resilient elements from the cut sheet of resilient material and into the lattice of reinforcing material to form a resilient material assembly.

FIG. 26 is a sectional side view of a resilient material assembly on a die.

FIG. 27 is a sectional side view of a resilient material assembly being removed from a die.

FIG. 28 is a sectional side view of the resilient material assembly and an expanse of cloth or mesh material positioned between a work surface and a heat platen.

FIG. 29 is a sectional side view of a first composite material being formed with a heat platen.

FIG. 30 is a sectional side view of the first composite material.

FIG. 31 is a sectional side view of a second composite material formed from the first composite material.

FIG. 32 is a sectional side view of the second composite material and an expanse of cloth or mesh material positioned between a work surface and a heat platen.

FIG. 33 is a sectional side view of a third composite material being formed from the second composite material with a heat platen.

FIG. 34 is a sectional side view of the third composite material.

FIG. 35 is a sectional side view of the second composite material, a lattice of reinforcing material and an expanse of cloth or mesh material positioned between a work surface and a heat platen.

FIG. 36 is a sectional side view of an intermediate step in forming a fourth composite material with a heat platen.

FIG. 37 is a sectional side view of the fourth composite material being formed with a heat platen.

FIG. 38 is a sectional side view of the fourth composite material showing partial reinforcement.

FIG. 39 is a sectional side view of the first composite material and an expanse of cloth or mesh material positioned between a work surface and a heat platen.

FIG. 40 is a sectional side view of a fifth composite material being formed with a heat platen.

FIG. 41 is a sectional side view of the fifth composite material.

FIG. 42 is a sectional side view of the first composite material, a lattice of reinforcing material and an expanse of cloth or mesh material positioned between a work surface and a heat platen.

FIG. 43 is a sectional side view of a sixth composite material being formed from with a heat platen.

FIG. 44 is a sectional side view of the sixth composite material showing full reinforcement.

FIG. 46 is sectional side view of the cut resilient material and an expanse of cloth or mesh material positioned between a work surface and a heat platen.

FIG. 47 is a sectional side view of resilient material/substrate composite material being formed with a heat platen.

FIG. 48 is a sectional side view of the second composite material.

FIG. 49 is a sectional side view of the first composite material formed from the second composite material.

FIG. 50 is a sectional side view of the second composite material and an expanse of cloth or mesh material positioned between a work surface and a heat platen.

FIG. 51 is a sectional side view of a third composite material being formed from the second composite material with a heat platen.

FIG. 52 is a sectional side view of the third composite material.

FIG. 53 is a sectional side view of the second composite material, a lattice of reinforcing material and an expanse of cloth or mesh material positioned between a work surface and a heat platen.

FIG. 54 is a sectional side view of an intermediate step in forming a fourth composite material with a heat platen.

FIG. 55 is a sectional side view of the fourth composite material being formed with a heat platen.

FIG. 56 is a sectional side view of the fourth composite material.

FIG. 57 is a sectional side view of the first composite material, a lattice of reinforcing material and an expanse of cloth or mesh material positioned between a work surface and a heat platen.

FIG. 58 is a sectional side view of a sixth composite material being formed with a heat platen.

FIG. 59 is a sectional side view of the sixth composite material.

DISCLOSURE OF THE INVENTION

Figure 1:
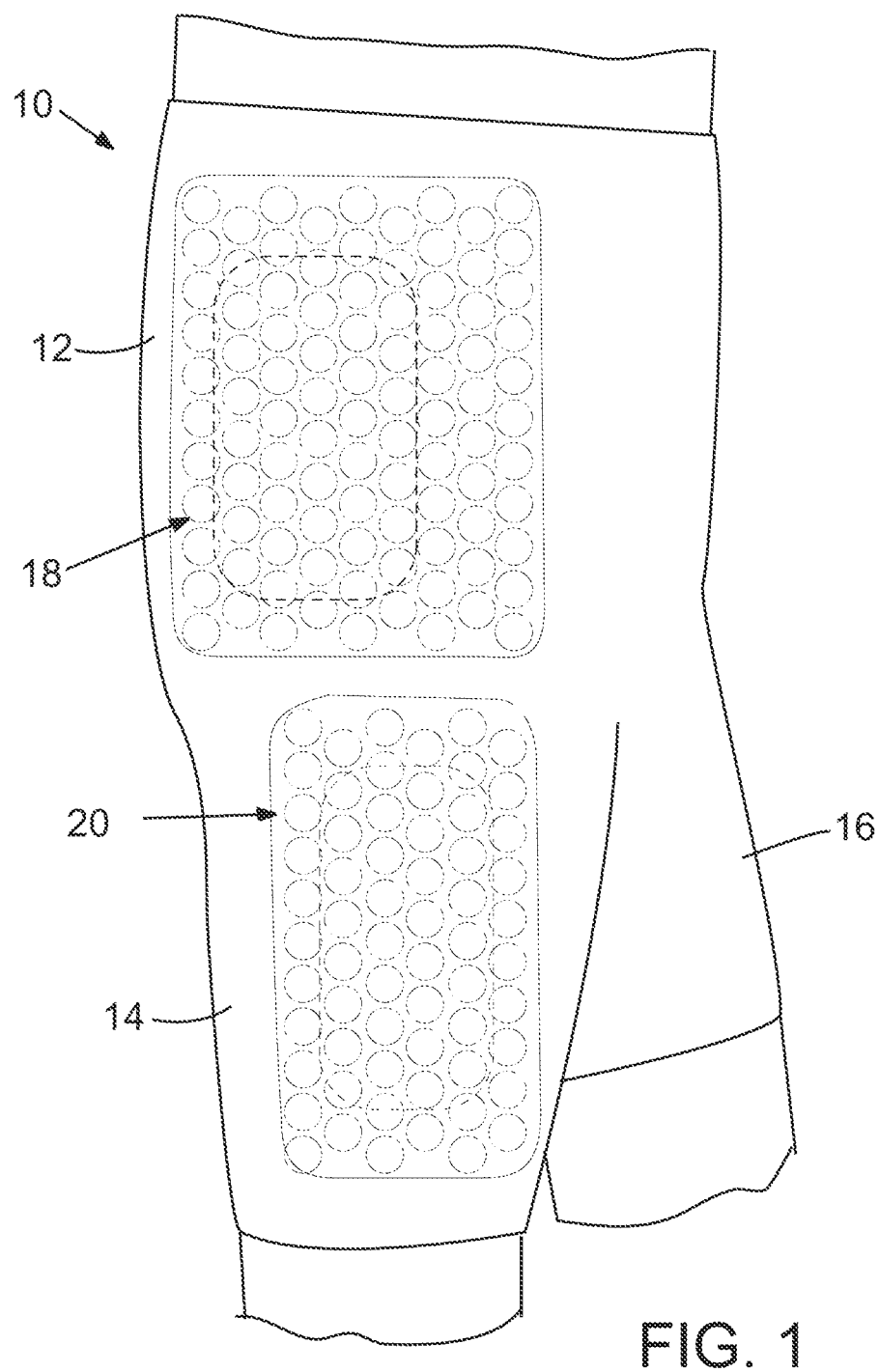
FIG. 1 is a drawing of an application of the resilient pad composite used in an undergarment.

In the present application, "a" and "an" are used to refer to both single and a plurality of objects.

In one aspect, the composition of the resilient elements may include without limitation some type of resilient material, such as foam, rubber, elastomer, plastic, and so forth (including a combination of such materials). Functionally, the resilient elements may act as a cushion against impact, or provide insulation to heat, depending on the types and material of the resilient element that is made.

The shape of the resilient element may be in any form, so long as it is able to be reinforced by the reinforcing structure. While the resilient elements shown in the drawings are depicted as cylindrical through its cross-sectional view, each resilient element may have the same or a different shape than the other resilient elements, so long as a plurality of the resilient elements, or the desired subset of the resilient elements, can be reinforced by the selected reinforcement lattice(s). Typically, the resilient elements will be cylindrical, but other regular and irregular shapes may be made such as, without limitation, a block shape, a conical structure, a tapered cylindrical structure or a tapered block structure, or a cylinder, cone, or block having a constricted middle section, which may allow for greater "grabbing" by the element reinforcing structure by allowing the element reinforcing structure to contact the constricted middle portion of the cylinder or block. It is understood that to form these various shapes, each cutting elements will have a shape corresponding to the desired shape of its corresponding resilient element.

All manner of imaginable variation in size and shape of the resilient element is contemplated in the invention. It is to be noted that the height of the resilient elements may vary in a composite. For instance, the height may be made greater in areas where especially high impact is expected. In other words, there is no requirement that the height of the resilient elements as well as the resulting composite pad be uniform. The variability in height may be aesthetic or may serve a physical function. Regarding the shape of the resilient elements, while the presently exemplified shapes include oval and circular resilient elements in top plan view, other designs are contemplated within the present invention, such as various polygons, such as triangles, squares, pentagons, hexagons, heptagons, and so forth, including, dumbbell shapes, other irregular shapes or a mixture of any of these various shapes that can be imagined according to desirability. The shapes do not need to be uniform within a single composite, and in certain situations, a variety of different shapes and sizes of the resilient elements may be used. It is to be understood that the variability of the shape of the resilient elements and how closely spaced apart or how densely or loosely positioned the resilient elements are in relation to each other, may affect the stretchability and breathability of the assembly.

In another aspect, the element reinforcing structure may be made of a variety of different material, including without limitation, foam, neoprene, natural or synthetic leather, plastic, rubber (including, without limitation, latex and silicone), or synthetic fabric, depending on its use. In one aspect of the invention, the reinforcing structure may be made of a different material from the sheeting structure, depending on the use of the composite. For example, if it is desired that the element reinforcing structure be stable and not be stretchable as compared with the sheet structure, then the material for the reinforcing structure and the sheeting structure should be so chosen as to result in these properties. An example of this situation occurs in for instance, an elbow or knee pad, where the sheeting structure may be flexible but that the element and the element reinforcing structure should not be as flexible so that optimum cushioning may be provided to the angled elbow or knee through the stable placement of the element to the angled area.

The element reinforcing structure may be a hard material, which would restrict movement of the reinforcing structure within its environment, such as without limitation, hard foam, leather, rubber, or a plastic sheet.

If, on the other hand, it is desired that the reinforcing material be more stretchable than the resilient material, then a more stretchable material may be chosen for the element reinforcing material. It is understood that the material to be chosen to effectuate the desired stretching properties are available to a person of skill in the art.

The element reinforcing structure may be shaped flat or curved. The material for the element reinforcing structure may be adjusted to increase or decrease absorbency, breathability, stretchability, or tensile strength. The element reinforcing structure may include holes or openings to increase or decrease breathability, stretchability, and air circulation. Any manner of properties for the element reinforcing structure in contemplated within the purview of the invention.

Regarding the lattice of reinforcing material or otherwise referred to as reinforcement member, several of the lattices may be used together. Some may be stacked on top of each other interconnecting with other lattices on the same plane, or to lattices on different planes through engagement to common resilient elements, and so forth. Whereas the present application exemplifies certain shapes of lattices, a variety of lattice shapes for physical, functional or aesthetic purposes are contemplated. Lattices with cut-outs and other various shapes and sizes, for example, are contemplated within the invention. Indeed any shape imaginable can be made of the resilient elements and the lattice of reinforcing structure can be used in the composite pad of the invention.

In another aspect of the invention, the sheeting structure may be typically composed of a fabric, which may be natural or synthetic fabric. Alternatively, the sheeting structure may be flexible or pliable plastic, or latex, silicone, or other rubber material, or made of synthetic fiber, which impart breathability and stretchability to the assembly.

In a specific embodiment, the present invention is directed to a protective pad construction for use on, amongst other things, protective garments, headgear, athletic clothing, body armor, and other uses where light weight, breathable, stretchable, contourable shock absorption to not only protect the body but also as a padding is needed. Footwear, bags, backpacks, sacks, seats, and seat cushions are some of the many products that would benefit from combining with the inventive composite pad. The foam pad of the present invention is constructed in accordance with the preferred embodiments illustrated in the drawings.

A typical application of the inventive resilient or foam pad is shown in FIG. 1, where a representative undergarment is indicated generally at 10, and may be of a type used by athletes in football, baseball, basketball, etc. The undergarment is illustrated to show just one use of the inventive foam pads, and is not intended to limit application of the foam pad of the present invention to be placed only on undergarments. The inventive pads may be placed permanently or by reversible attachment on any object for which protection of the wearer from impact force is desired. Such reversible attachment may be carried out by without limitation zippers, velcro and so forth. Turning to FIG. 1, the garment includes an upper portion 12 for fitting around the waist and hips, and leg portions 14 and 16 which extend downwardly approximately midway along the thighs. The undergarment is constructed of suitable material for providing compression against the body, to aid in minimizing fatigue and strain during athletic activities. Shown mounted on the undergarment are protective pads, such as a hip pad indicated at 18 and a thigh pad indicated at 20. The provision of hip and thigh pads on undergarments is conventionally used, and FIG. 1 is merely provided to show where the inventive foam pads might typically be placed. Of course, foam pads could be placed on other areas of the undergarment, such as without limitation, on the backside and groin areas. And further foam pads could be placed on helmets, backpack linings, equipment linings, footwear, seats, and so forth.

The inventive composite material may comprise a laminated structure including a substrate, a plurality of discrete, spaced-apart resilient elements or foam elements and a reinforcing structure or lattice for surrounding selected resilient or foam elements, and at least an upper layer of fabric or mesh material. This foam pad or "package," of desired configuration, can be adapted for integration in numerous applications as has been described above.

Resilient Pad Composite with Partial Reinforcement

Figure 2:
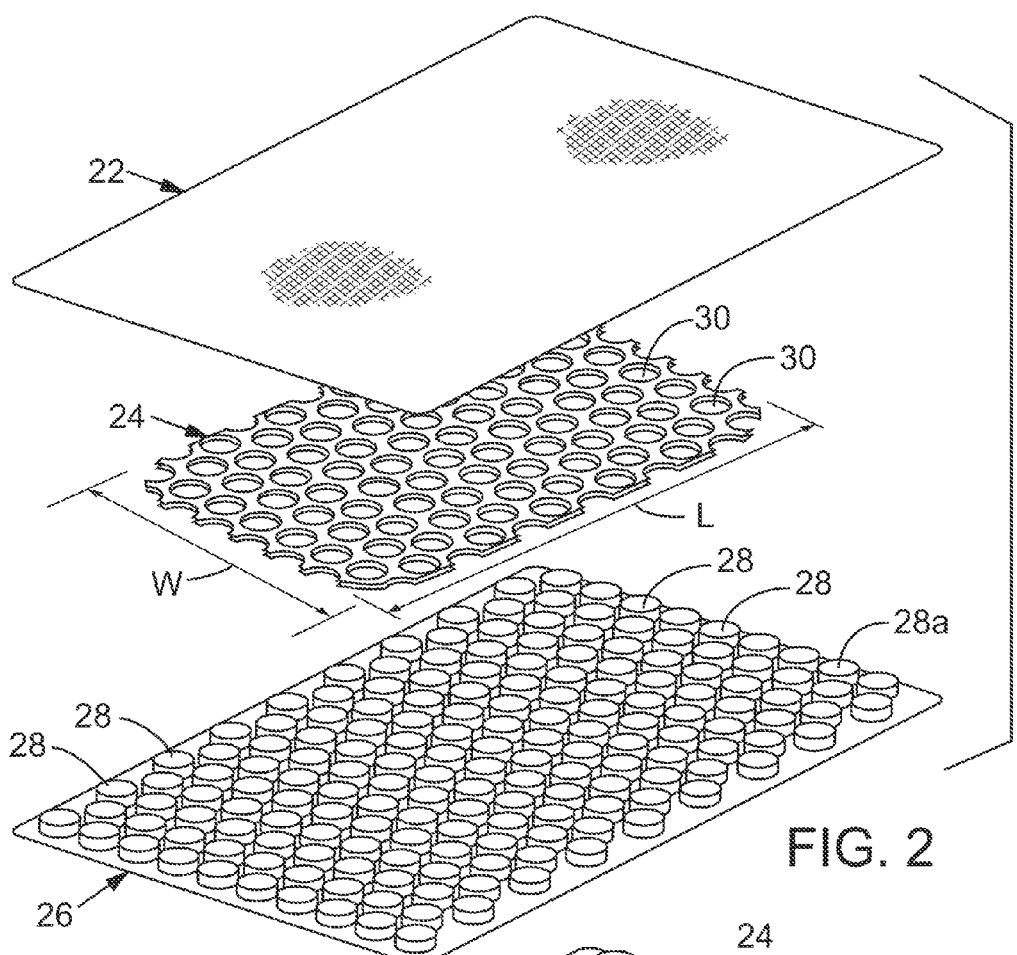
FIG. 2 is an exploded view of the resilient pad assembly, which includes the resilient elements, the partial reinforcement lattice and a support.

For convenience, the resilient pad composite material comprising elements of the invention will be referred to hereinafter in a specific embodiment as "foam pad". It is to be understood that while the present application describes the present invention as a "foam pad", the invention should not be limited to "foam" element, as other material may be used, and further the invention should not be necessarily limited to a "pad", as other uses of the composite are contemplated in the invention, such as elbow and knee guards and protectors, shin guards, shoulder guards and protectors, and chest protectors for athletes; exercise mats; back panels for backpacks, shoulder straps, and padding for weightlifting belts; helmet and hat linings, head protectors; linings for body armor; shoe midsoles, shoe outsoles, shoe inner lining, and other applications where lightweight, breathable, stretchable, contourable, flexible protective cushioning is desired. As shown in FIG. 2, a foam pad with partial reinforcement is shown in an exploded view. The foam pad includes an upper layer of fabric or mesh material generally indicated at 22, an intermediate or partial reinforcement member 24 which may be thought of as a "cage," because it captures selected ones of foam elements. A substrate of fabric or mesh material is indicated at 26, and a plurality of discrete, spaced-apart foam elements are indicated at 28. The foam elements, in this example are shown as being optionally circular or oval in cross-section and are optionally cylindrical in form.

The foam pads may be made of suitable foam material, such as EVA, PE, Neoprene, or other foam material. In the exploded view in FIG. 2, an upper surface of the foam elements is exposed, it being understood that the lower surface has been optionally suitably bonded, by appropriate adhesive material, in a laminating process to the upper surface of substrate 26. The upper surface of the foam elements, such as indicated at 28a is also provided with adhesive material which upon suitable application of heat can be laminated to mesh material 22.

Partial reinforcement member or lattice 24 is dimensioned with a cross-sectional area which is less than that of the area occupied by resilient or foam elements 28 on substrate 26. Reinforcement member 24 is provided with a plurality of openings, in this case circular openings 30 which are dimensioned with a diameter greater than the diameters of foam elements 28.

As can be seen, reinforcement member 24 is dimensioned with a width W and a length L less than the width and length of the area occupied by foam elements 28 on substrate 26. In assembly, reinforcement member 24 is displaced over a region of the expanse of foam elements 28, as shown in FIG. 3 so that certain of the foam elements are confined within corresponding apertures of reinforcement member 24 while remainder ones of the foam elements remain unconstrained.

Figure 3:
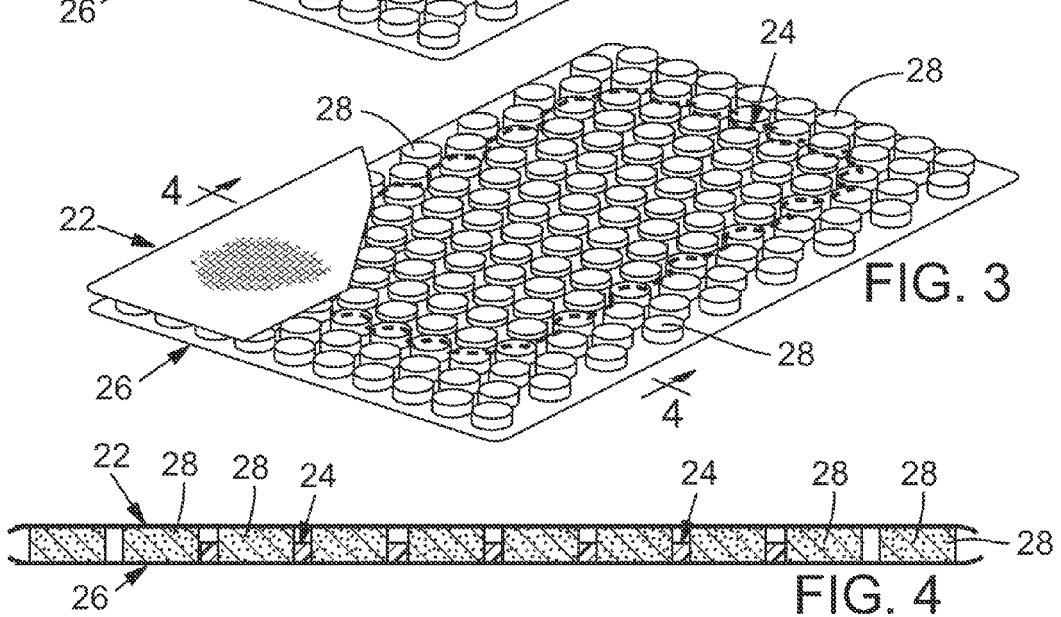
FIG. 3 is a partial cut away view of the resilient pad assembly, which includes the resilient elements, the partial reinforcement lattice and a support.
Figure 4:
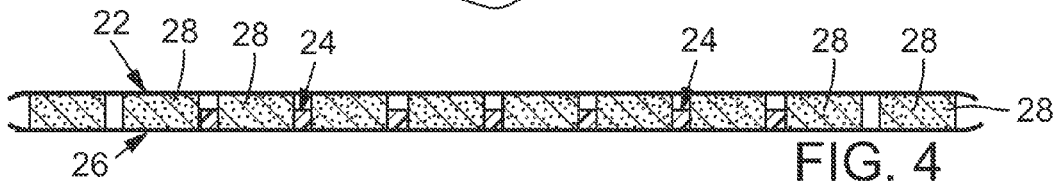
FIG. 4 is a side view of the resilient pad assembly, which includes the resilient elements, the partial reinforcement lattice and a support.

As shown in FIG. 3, there are outer rows of foam elements 28 which are not constrained by reinforcement member 24. This can be appreciated further by viewing FIG. 4, which is a cross-sectional view taken along lines 4-4, where it can be seen that when reinforcement member 24 is downwardly positioned over aligned ones of foam elements 28, a portion of each of the foam elements extends above the upper surface of reinforcement member 24. Outer rows of foam elements 28 are not constrained by reinforcement member 24. As also shown in FIG. 4, the composite are sandwich construction includes upper layer 22 adhered onto the upper surface of foam elements 28. Upper surface 22 is adhered to the foam element in a lamination process; as mentioned previously, substrate 26 was adhered to the bottom surface of foam elements by a lamination process as well.

The construction as described above, with inclusion of a partial reinforcement member provides distinct advantages when the composite foam pad is utilized for protection. While FIGS. 2-4 illustrate a foam pad having a generally rectangular configuration, and with partial reinforcement member 24 also being generally rectangular, it should be appreciated that other configurations, such as circular, oblong, triangular, etc. could be readily provided, depending upon the particular placement of the foam pad. For example, if the composite foam pad is placed on a thigh or hip, it may well have a different configuration than if it is placed on headgear, for protection on the elbow, knee, shin, or other area of the body. Partial reinforcement, as described above, enables a composite foam pad to provide several important advantages. First, designation of a specific area to be covered by the reinforcement member enables the foam elements on the fabric, outside of the reinforcement member to move along with the fabric as it is stretched. This stretching may occur, depending upon body part movement, such as the leg, arm or wherever the composite foam pad is provided. The foam element captured within the reinforcement member of course will not move with the stretching action nearly as much as the foam elements outside of the reinforcement member. The reinforcement member also provides additional shock absorbing capability. As shown in FIG. 4, reinforcement member 24 is dimensioned so that a portion of the foam elements 28 optionally extend above the upper surface of the reinforcement member. This enables the foam elements to be compressed upon impact, but the compression is limited in a downward direction by the surface of the reinforcement member. However, the height of the resilient elements may be varied and is not limited to a height extending above the upper surface of the reinforcement member. The reinforcement member may be constructed of a less resilient material and therefore provides enhanced shock absorbing effect. Apertures 30 provided in reinforcement member 24 optionally may be dimensioned with a diameter greater than that of foam elements 28, so that there is some play of each foam element within its associated aperture 30 in the composite foam pad. Greater differences in the diameter allow more air to circulate within the pad resulting in a pad with greater flexibility and with enhanced circulation or "breathing".

Thus, from the description above, it can be seen that the partial reinforcement member 24 provides extra protection, while still enabling a composite foam pad to stretch. With this general construction in mind, it can be appreciated that reinforcement member 24 may be designed to custom specifications and protect a given area while allowing another area to stretch where articulation is necessary. The combination of breathability can be insured by areas not covered by the reinforcement member and the reinforcement member itself may provide an enhanced amount of insulation. Moreover, the foam elements such as indicated at 28 and the reinforcement member 24 may be suitably provided with a bore extending therethrough which can enhance circulation, again depending on the particular application of the foam pad.

While not specifically shown in FIG. 2, multiple reinforcement members or lattices may be provided at selected locations to capture selected ones of the foam elements. Reinforcement lattices, as illustrated above, and in particular with respect to FIG. 4, can be seen to provide an area of circulation between the upper layer 22 and the top surface of the reinforcement lattice. In essence an air chamber is provided, and this circulation may be important for comfort. Moreover, the foam elements first absorb an impact and then the reinforcement member absorbs further impact as the foam elements depress, therefore absorbing more energy from an impact. The reinforcement member also maintains those foam elements captured therewithin in a substantially uniform position. This may be important for protecting a certain area of the body; a portion of the foam pad may stretch to accommodate movement but those foam elements captured within the reinforcement member maintain a substantially uniform orientation with respect to that body portion sought to be protected.

The reinforcement member also will help prevent damage to those foam elements captured within the reinforcement member; for example, certain types of impact may cause foam elements to be compressed toward one another, and could cause damage to them. With the reinforcement member in position, the foam elements captured within the reinforcement member are spaced apart and maintained apart, thereby enhancing their integrity and wear.

Resilient Pad Composite with Full Reinforcement

The present invention also contemplates a composite foam pad in which there is full reinforcement, and that construction is shown in the exploded view of FIG. 5. Specifically, an intermediate full reinforcement member or cage, generally indicated at 25 is provided with apertures for alignment for receiving therewithin foam elements 28 in a composite structure. The foam pad as optionally fully laminated is shown in FIG. 6, and as can be seen, along with FIG. 7, the foam elements optionally extend above the surface of the reinforcement member 25 and fabric 22 is suitably laminated to provide the composite construction. However, the height of the resilient elements may be varied and is not limited to a height extending above the upper surface of the reinforcement member. It is recognized that the distinction between a "partial" or "full" reinforcement member may blur, depending upon the number of foam elements and the specific outline or configuration of the reinforcement member. For example, while FIG. 6 shows a full reinforcement member which contemplates capturing substantially all of the foam elements, a reinforcement member may be constructed intermediate in size, as say between reinforcement members 24 and 25. Again, the relative dimensions of a reinforcement member depend upon the need and where the protection is needed. Of course with the full reinforcement member as shown in FIG. 6, stretching of the fabric is limited significantly from the capability of the fabric shown in FIG. 3, which shows partial reinforcement member. It is understood that a reinforcement member (whether partial or full) may link with another reinforcement member through engagement by another reinforcement member to shared resilient elements. For instance, reinforcement members positioned side by side on a resilient sheet may be more stably linked together by placing another reinforcement lattice stacked over the reinforcement members below by engaging the stacking reinforcement lattice to resilient elements common to the reinforcement members positioned on the resilient pad.

Resilient Pad Composite with Partial and Full Reinforcement

As shown in FIG. 8, a foam pad with partial and full reinforcement "stacked" is shown in an exploded view. The foam pad includes an upper layer of fabric or mesh material generally indicated at 22, and two intermediate members, such as partial reinforcement member 24 and full reinforcement member 25. As shown in the composite structure in FIGS. 9 and 10, reinforcement member 24 is mounted on top of reinforcement member 25 and in that area of overlap, compressibility of foam elements 28 is greatly diminished. While there are areas above reinforcement member 25 where reinforcement member 24 does not repose, and more compression of adjacent foam elements is maintained, it should be appreciated that the "stacked" arrangement of the reinforcement members provides a further enhanced area of impact protection. Depending upon the relative sizes of the reinforcement members, there can be a stacked configuration of "partial" cages which would enable outlining areas of the mesh or fabric to still provide stretchability. The point here is that there are numerous types of combinations and configurations which can be provided with the multiple, stacked reinforcement member configuration shown. What is more, with the concept of stacking, portions of the composite foam pad may be reinforced with stacked reinforcement members while other portions may have a partial reinforcement member. Choice of perimeters and design enable customization of a foam pad with reinforcement and stability as desired. FIG. 11 shows a different type of foam element construction, in this case a conical configuration which would allow a reinforcement member to be received thereover but provide further air space for breathability. Breathability is also enhanced by the foam element construction shown in FIG. 12, namely, that a bore may be optionally constructed through each foam element such that breathability between the upper fabric 22 and lower substrate 26 is provided.

FIGS. 13A-13D show examples of different configurations of foam elements which may be utilized in a cage construction. FIG. 13A shows an elongated foam element, and the arrows indicate that a cage may have movement caused by impact or relaxing of impact. FIG. 13B shows an elongated conical foam element and FIG. 13C shows a foam element formed of a wider base portion. FIG. 13D shows a pair of truncated cones facing one another which would tend to localize a cage intermediate the top and bottom of the resilient or foam element, rather than near the top surface of the substrate or adjacent the bottom surface of the upper layer.

It will be noted that in FIG. 4, partial reinforcement member 24 is shown disposed against substrate 26. However, it should be recognized that the reinforcement member may move vertically or horizontally while engaged to the resilient elements or "jiggle" or "float" between upper layer 22 and substrate 26, depending on the height of the reinforcement member in relation to the resilient elements. There is more "float" or "jiggle" if the height of the resilient element is higher. This also depends, of course, upon the configuration of the foam elements, the relative friction between the foam elements and the openings of the reinforcement member and the degree and force of impact, if and when that occurs. Similarly, while FIG. 7 shows full reinforcement member 25 positioned against substrate 26, that reinforcement member may move or float between upper layer 22 and substrate 26. In the embodiment shown in FIG. 10, depending upon the relative thicknesses of partial reinforcement member 24 and full reinforcement member 25, floating action or movement of the "stacked" reinforcement members may be limited to a lesser degree than if a single reinforcement member, whether partial or full, were utilized.

A First Process for Making the Resilient Composite Pad

The present invention also relates to a process for making composite pads with no reinforcement, partial reinforcement, full reinforcement, and both partial and full reinforcement, such as depicted in FIGS. 1-13. In one exemplified method, the process generally comprises:

(a) providing a sheet of resilient material having opposing sides;

(b) applying an adhesive to either or both sides of the sheet of resilient material;

(c) providing a first cutter having a surface and a plurality of cutting elements extending from the surface in a predetermined pattern, where each cutting element has a shape defining an internal space, wherein the plurality of cutting elements are spaced apart from one another to define a contiguous space surrounding and between the plurality of cutting elements, and the internal spaces and the contiguous space are optionally filled with biasing material;

(d) pressing the first cutter into the sheet of resilient material, thereby forming a cut sheet of resilient material comprising a plurality of resilient elements and an excess resilient material, where each resilient element has a shape corresponding to the shape of the internal space of its corresponding cutting element, the plurality of resilient elements form a pattern corresponding to the predetermined pattern of the plurality of cutting elements, and the excess resilient material has a shape corresponding to the shape of the contiguous space;

(e) withdrawing the cutter from the cut sheet of resilient material, whereby the biasing material urges the plurality of resilient elements and the excess resilient material away from the internal spaces within and the contiguous space surrounding the plurality of cutting elements, thereby leaving the cut sheet of resilient material with the cut portions of the resilient elements surrounded by the excess resilient material;

(f) separately providing a sheet of reinforcing material, which may be optionally processed using the methods described in steps (g)-(i), however, the methods of processing a reinforcement lattice is not limited to carrying out the following steps, so long as at least one reinforcement lattice is obtained so as to be combinable with the resilient elements to form the inventive composite pad;

(g) pressing a second cutter into the sheet of reinforcing material, thereby forming a cut sheet of reinforcing material comprising a plurality of reinforcing elements and at least one lattice of reinforcing material, where each reinforcing element has a size and shape corresponding to the predetermined size and shape of the cutting elements, the plurality of reinforcing elements form a pattern corresponding to the predetermined pattern of the plurality of cutting elements, and the lattice of reinforcing material has a shape corresponding to the shape of the contiguous space;

(h) withdrawing the second cutter from the cut sheet of reinforcing material, whereby if the biasing material is optionally used, the biasing material urges the plurality of reinforcing elements and the lattice of reinforcing material away from the internal spaces within and the contiguous space surrounding the plurality of cutting elements, and thereby leaves the cut sheet of reinforcing material with the cut portions of the reinforcing elements optionally surrounded by the lattice of reinforcing material;

(i) separating the lattice of reinforcing material from the reinforcing elements, whereby the lattice of reinforcing material is left with a plurality of holes through the reinforcing material where the reinforcing elements used to be;

(j) providing a die comprising a surface having a plurality of openings defined therein, where the surface surrounding the openings has a shape substantially corresponding to the shape of the excess resilient material in the cut sheet of resilient material, and to the shape of the lattice of reinforcing material, and where at least a plurality of openings form a pattern corresponding to the pattern of at least some of the resilient elements in the cut sheet of the resilient material;

(k) placing at least one lattice of reinforcing material on the die and aligning the lattice of reinforcing material so that the plurality of holes in the lattice of reinforcing material are positioned above the plurality of openings in the die;

(l) placing the cut sheet of resilient material on top of the lattice of reinforcing material, and aligning the cut sheet of resilient material so that the plurality of resilient elements are positioned above the plurality of holes in the lattice of reinforcing material, and above the plurality of openings in the die;

(m) providing a pusher having a plurality of push elements that form a pattern corresponding to the pattern of the resilient elements in the cut sheet of resilient material;

(n) aligning the plurality of push elements with the plurality of resilient elements, and using the pusher to push the resilient elements out of the cut sheet of resilient material, whereby the plurality of resilient elements are pushed into the plurality of holes in at least one lattice of reinforcing material and others into the plurality of openings directly in the die, thereby forming a resilient material assembly comprising the plurality of resilient elements at least partially surrounded by at least one lattice of reinforcing material;

(o) removing the resilient material assembly from the die, and placing the resilient material assembly below a heat platen, if heat-activated adhesive material is applied to a side of the resilient material;

(p) placing a sheet of fabric or mesh material or any other suitable material onto one side of the resilient material assembly, wherein steps (o) and (p) may be reversed; and (q) heating the fabric or mesh sheet or any other suitable material with the heat platen to activate the adhesive on the plurality of resilient elements, whereby the fabric or mesh material or any other suitable material adheres to the plurality of resilient elements to form the composite material.

The adhesive material used need not be limited to heat-activated type. Other types of adhesives that may be used include, without limitation, heat-activated adhesive laminate, two-sided adhesives with removable backing, or the like.

Suitable material for adhering to the plurality of resilient elements may include without limitation, natural or synthetic fabric, mesh, flexible or pliable plastic, latex, silicone, or other rubber material, or made of synthetic fiber. As will be appreciated from the description of the preferred embodiments below, this general process may be used to form various composite materials, including but not limited to composite pads with no reinforcement, partial reinforcement, full reinforcement, and both partial and full reinforcement of the resilient elements by resilient material.

Process for Making Resilient Elements

Figure 14:
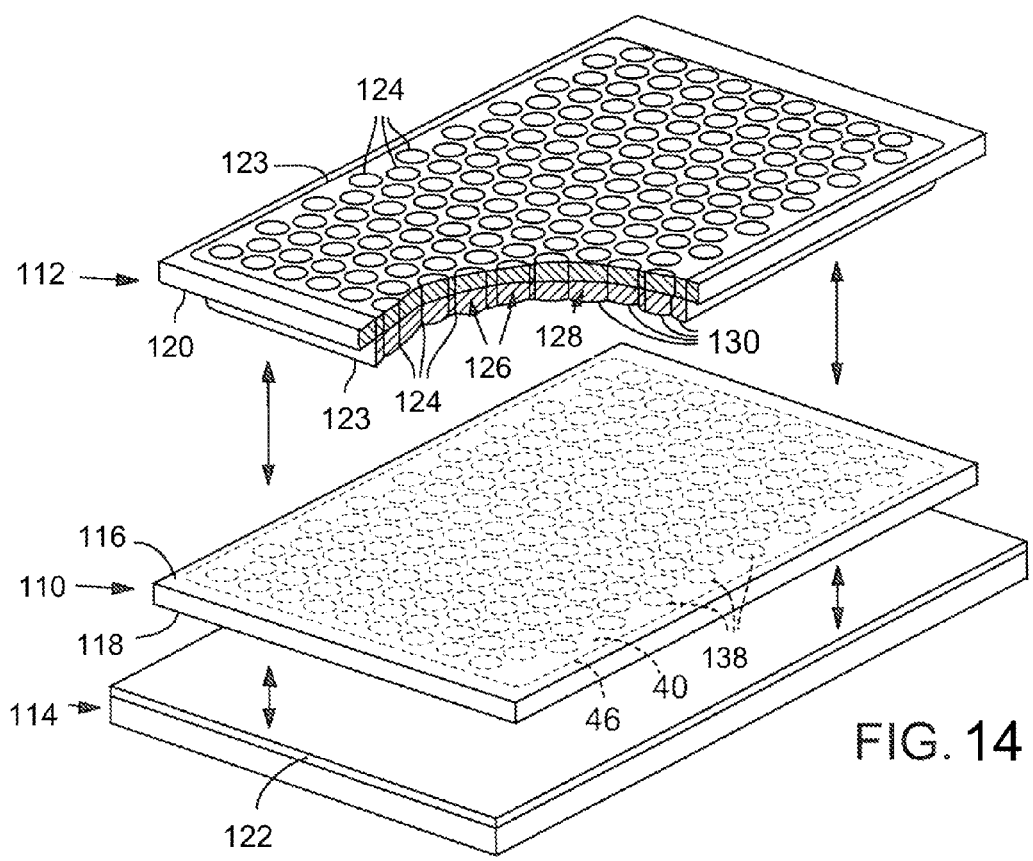
FIG. 14 is an exploded and perspective view of a sheet of resilient material positioned between a cutter and a work surface.
Figure 22:
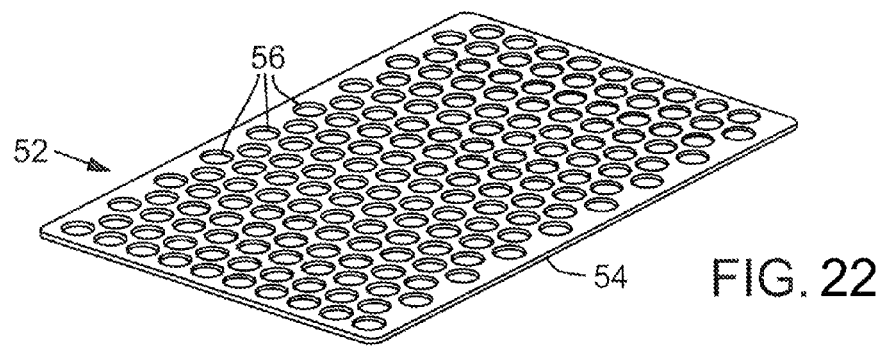
FIG. 22 is a perspective view of a lattice of reinforcing material.

Referring now to the drawings, FIGS. 14-22 generally show the process for cutting sheets of resilient and reinforcing materials to form cut sheets of resilient or reinforcing materials. FIG. 14 shows a sheet of resilient material 110 positioned between a cutter 112 and a work surface 114. The sheet of resilient material shown in FIG. 14 is depicted in solid lines as an uncut sheet, whereas the dashed lines show how the sheet of resilient material looks after it has been cut with the cutter in the manner described below. The sheet of resilient material may be made of such materials as foam, rubber, elastomer, plastic, and so forth (including any combination of such materials), and includes a first side 116 and a second side 118 opposing the first side. The material may be selected for various properties that make it an effective pad for protective gear. For example, the material may be selected based on its resilience to impact, heat insulation properties, breathability, weight, ease of use in manufacturing, or any other desirable properties.

As an initial step in the process, an adhesive may be applied to the first side 116, and/or the second side 118 of the sheet of resilient material 110 prior to cutting, although in a preferred embodiment, adhesive is applied to both sides. Any suitable means for applying adhesive may be used, including a spray-on adhesive, roll-on adhesive, lamination, or the like. Likewise, any suitable adhesive may be used, including a heat-activated adhesive or laminate, two-sided adhesives with removable backing, etc.

After adhesive has been applied to the resilient material, the resilient material may be cut in a desired and predetermined manner using a cutter, such as cutter 112. The cutter may include a cutting surface 120 for supporting various cutting edges or other structures. The cutting surface may be substantially planar for use in cutting resilient and reinforcing materials that are planar, or that are flexible and are configured in a planar shape beneath the cutter on a planar surface, such as a table or other work space. Alternatively or additionally, the cutting surface may be irregularly shaped for cutting resilient or reinforcing materials that are irregularly shaped, or that are flexible and are configured in an irregular shape beneath the cutter on an irregularly shaped surface. For example, as shown in FIG. 14, the cutter may be planar for use in cutting flexible resilient and reinforcing materials that are positioned on a planar work surface 114, where the work surface may additionally include a durable yet elastic overlay 122 that prevents or inhibits dulling of cutting edges during operation. For example, the overlay may be made of plastic, nylon, rubber or any other suitable material that prevents or inhibits dulling of cutting edges during operation.

As shown in FIGS. 14-20, the cutter 112 may include various cutting edges for cutting resilient and reinforcing materials. For example, as shown in FIG. 14, the cutter may include a perimetral cutting edge 123 extending from the cutting surface 120 and defining a boundary. This perimetral cutting edge may be sharpened at the end used for engaging and cutting materials, and may be shaped to cut materials into shapes having a desired border that corresponds to the shape of the boundary defined by the perimetral cutting surface.

As shown in FIGS. 14-20, the cutter 112 may also include a plurality of cutting elements 124 extending from the cutting surface to form a preselected pattern, each cutting element being sharpened at the end used for engaging and cutting materials. The cutting elements may be positioned within the boundary defined by the perimetral cutting edge 123, although any conceivable configuration of cutting elements may be provided. Each cutting element is shaped to define an internal space 126 corresponding to the desired shape of cut material. For example, cutting elements may be substantially cylindrical for cutting cylindrically shaped elements into materials, or may have irregular shapes for cutting irregularly shaped elements into materials. The cutting elements may be spaced from one another so as to define a space between the cutting elements. For example, in embodiments having both a perimetral cutting edge and a plurality of cutting elements positioned in a pattern within the boundary defined by the perimetral cutting edge, the perimetral cutting edge and the cutting elements may define a contiguous space 128 that surrounds the plurality of cutting elements and is within the boundary.

The internal spaces 126 and/or the contiguous space 128 may be filled with a biasing material 130 to facilitate removal of cut portions of the resilient and/or reinforcing material from the internal spaces and contiguous space. In some embodiments, both the internal spaces and the contiguous space may be filled with biasing material to facilitate removal of the cut portions from those spaces, and to facilitate keeping the various portions of cut material in an assemblage, as will be described in more detail below. In some embodiments, either the internal spaces or the contiguous space will be filled with biasing material to facilitate removal of the cut portions from those spaces but to retain the cut portions within the spaces that do not have any biasing material. The biasing material may be a resilient material, including, either alone or in combination, foam, rubber, elastomer, plastic, etc., and may be more or less resilient than the material to be cut. In some embodiments, the biasing material will be more resilient than the material being cut, to facilitate biasing of cut materials from the spaces containing the biasing material.

The biasing material used in the cutter may be made of any suitable resilient material that permits biasing of cut materials out of the internal spaces and contiguous space defined by the cutting elements and/or the perimetral cutting edge. The biasing material may be less resilient than the resilient material, the reinforcing material, or both. Selection of an appropriate biasing material requires little experimentation, and is within the capabilities of one of ordinary skill in the art.

It is understood that the biasing material used in the resilient material cutting process may include any material or mechanism, which serves to press the cut resilient element as the cut is made, so that the resilient element and the excess resilient material stay together on the cut sheet and are not separated. Examples of such biasing material may include without limitation rubber or a spring mechanism.

As shown in FIGS. 14 and 15, the sheet of resilient material 110 is positioned on the work surface 114, such as on the protective overlay 122, between the work surface and the cutter 112. As shown in FIGS. 14 and 16, the cutter is then pressed into the sheet of resilient material. This causes the cutting edges of the cutter (such as the perimetral cutting edge 123 shown in FIG. 14 and/or the plurality of cutting elements 124 shown in FIGS. 14 and 16) and the biasing material 130 (such as is in the internal spaces 126 and/or the contiguous space 128), to engage and compress the sheet of resilient material. During this compression process, the biasing material may also be compressed. As pressure is increased by the cutter on the sheet of resilient material, the cutting edges cut through the material, thereby forming a cut sheet of resilient material 136 comprising a plurality of resilient elements 138 and excess resilient material 40. Each resilient element has a first side 42 and a second side 44 with the adhesive applied thereto, and a shape corresponding to the shape of the internal space 126 of its corresponding cutting element. The plurality of resilient elements forms a pattern corresponding to the predetermined pattern of the plurality of cutting elements. The excess resilient material has a shape corresponding to the shape of the contiguous space 128. As such, for embodiments that include a cutter having a perimetral cutting edge 123 that defines the outer boundary of the contiguous space, the excess resilient material will include a border 46 cut by the perimetral cutting edge (See FIG. 14).

After the cutting edges of the cutter 112 have cut completely through the sheet of resilient material, the cutter is withdrawn from the cut sheet of resilient material 136, as shown in FIGS. 14 and 17. The cut sheet of resilient material 136, including the plurality of resilient elements 138 and the excess resilient material 40, decompresses during this process. The biasing material 130 also decompresses, thereby urging the plurality of resilient elements and the excess resilient material away from the internal spaces 126 within, and the contiguous space 128 surrounding, the plurality of cutting elements 124, to leave the cut sheet of resilient material with the cut portions of the resilient elements surrounded by the excess resilient material.

Process for Making Lattice of Reinforcing Material

A similar process is used to cut a sheet of reinforcing material as the resilient material, as shown in FIGS. 18-22. First, a sheet of reinforcing material 47 is selected based on its desired properties. The sheet of reinforcing material may be made of foam, neoprene, natural leather, synthetic leather, plastic, or rubber (including without limitation, latex and silicone, synthetic fabric, and so forth and any combination of such materials), may have a different thickness from the sheet of resilient material, and may include the same or different material from the resilient material, and may have the same or different functional properties from the resilient material. For example, the reinforcing material may be more or less resilient, rigid, flexible, stretchy, breathable, etc., than the resilient material.

As shown in FIG. 18, the sheet of reinforcing material 47 is positioned on the work surface 114, such as on the protective overlay 122, between the work surface and the cutter 112. As shown in FIG. 19, the cutter is then pressed into the sheet of reinforcing material, which causes the cutting edges of the cutter (such as the perimetral cutting edge 123 shown in FIG. 14 and/or the plurality of cutting elements 124 shown in FIGS. 14 and 18) and the biasing material 130 (such as are in the internal spaces 126 and/or the contiguous space 128), to engage and compress the sheet of reinforcing material. As discussed above, the biasing material may also be compressed during this compression process. As pressure is increased by the cutter on the sheet of reinforcing material, the cutting edges cut through the material, thereby forming a cut sheet of reinforcing material 48 comprising a plurality of reinforcing elements 50 and a first lattice of reinforcing material 52 having a shape which enables resilient elements to fit through the first lattice of reinforcing material. Each reinforcing element has a shape corresponding to the shape of the internal space 126 of its corresponding cutting element. The plurality of reinforcing elements forms a pattern corresponding to the predetermined pattern of the plurality of cutting elements. The first lattice of reinforcing material has a shape corresponding to the shape of the contiguous space 128. As such, for embodiments that include a perimetral cutting edge 123 that defines the outer boundary of the contiguous space, the first lattice of reinforcing material will include a border 54 cut by the perimetral cutting edge (See FIG. 22).

It is to be noted that in one embodiment, if a particular partial reinforcement lattice is desired to be combined with a section of resilient material, more than one perimetral cutting edge may be incorporated into the cutter to cut a sheet of reinforcement material, so that the design or the outer perimeter of the particular partial reinforcement lattice is defined by one of the perimetral cutting edges on the cutter, and additional inner perimeters of the same partial reinforcement lattice is defined by one or more of the remaining perimetral cutting edges. Depending on the need, after the holes are punched out in the sheet of reinforcement material, the resulting lattice of reinforcement material has been engaged to at least one of the resilient elements, and the fabric or mesh material or any other suitable material has been adhered to the plurality of resilient elements to form the composite material, the particular partial lattice that is desired to be combined with the resilient elements may be made by pulling or removing the undesired reinforcement material along the perimetral edges defining the boundary of the particular partial reinforcement lattice. Thus, the particular partial lattice of reinforcement material or "partial cage" may be cut and may be combined with the resilient material. Several of these particular partial reinforcement lattices may be incorporated into a resilient pad, resulting in unique properties of the pad. Each of these partial reinforcement lattice may have different properties such as height, strength, resilience and so forth. A combination of these lattices impart unique function to the composite pad.

After the cutting edges of the cutter 112 have cut completely through the sheet of reinforcing material, the cutter is withdrawn from the cut sheet of reinforcing material 48, as shown in FIG. 20. The cut sheet of reinforcing material 48, including the plurality of reinforcing elements 50 and the first lattice of reinforcing material 52, decompresses during this process. The biasing material 130 also decompresses, thereby urging the plurality of reinforcing elements and the first lattice of reinforcing material away from the internal spaces 126 within, and the contiguous space 128 surrounding, the plurality of cutting elements 124, to leave the cut sheet of reinforcing material with the cut portions of the reinforcing elements optionally surrounded by the first lattice of reinforcing material. It is understood that the cut sheet of reinforcing material 48 need not contain any reinforcing element as the reinforcing element is discarded and therefore, the cut sheet of reinforcing material does not intentionally preserve the reinforcing elements surrounded by the lattice of reinforcing material.

It should be appreciated that the fully and partially reinforced composite materials made by the present process only include lattices made of the reinforcing material, and do not utilize the reinforcing elements cut by the cutter. As such, the first lattice of reinforcing material 52 cut from the sheet of reinforcing material may be separated from the reinforcing elements 50 and from any other leftover reinforcing material, thereby leaving the first lattice of reinforcing material by itself, as shown in FIG. 21. The remaining first lattice of reinforcing material 52, shown in FIGS. 21-22, thus includes a plurality of holes 56 through the reinforcing material where the reinforcing elements used to be, and may also include a border 54, such as is cut by a perimetral cutting edge 123.

Assembling Resilient Pad Using a Die

After forming the cut sheet of resilient material 136 (including the plurality of resilient elements 138 and the excess resilient material 40), and the first lattice of reinforcing material 52, the first lattice of reinforcing material is assembled with the plurality of resilient elements to form a resilient material assembly using a die 58 and a pusher 60, according to the process shown in FIGS. 23-27.

Figure 23:
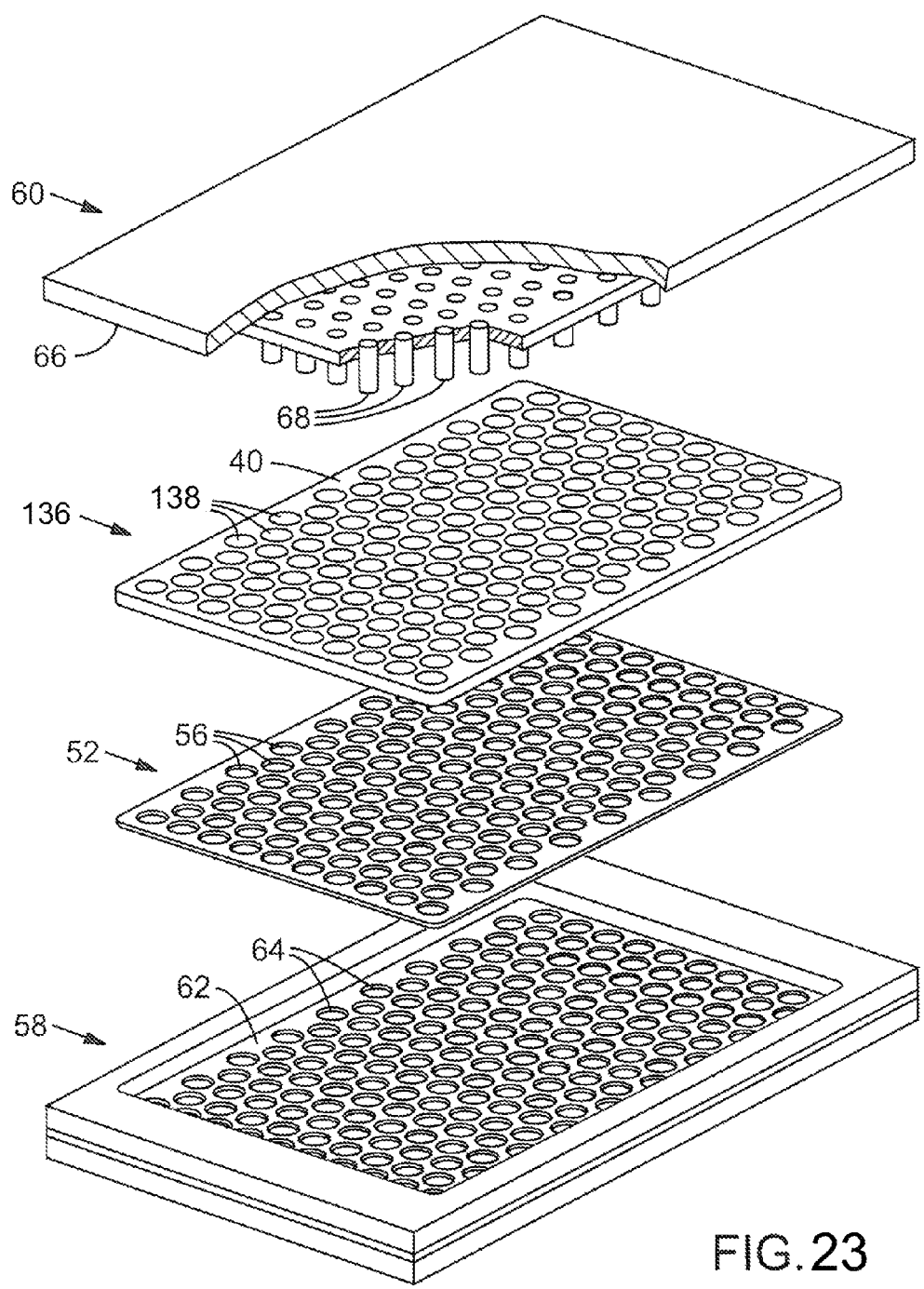
FIG. 23 is an exploded and perspective view of a cut sheet of resilient material and a lattice of reinforcing material positioned between a pusher and a die.

As shown in FIG. 23, the die 58 includes a surface 62 having a plurality of openings 64 defined therein, where the surface surrounding the openings has a shape corresponding to the shape of the excess resilient material 40 in the cut sheet of resilient material 136, and corresponding to the shape of the first lattice of reinforcing material 52, and the plurality of openings form a pattern corresponding to the pattern of the resilient elements 138 in the cut sheet of resilient material 136. The pusher includes a pushing surface 66 and a plurality of push elements 68 that extend from the push surface and form a pattern corresponding to the pattern of the resilient elements in the cut sheet of resilient material.

As shown in FIG. 24, the first lattice of reinforcing material 52 is placed on the die, and is aligned so that the plurality of holes 56 in the first lattice of reinforcing material are positioned above the plurality of openings 64 in the die 58. Next, the cut sheet of resilient material 136 is placed on top of the first lattice of reinforcing material, and is aligned so that the plurality of resilient elements 138 are positioned above the plurality of holes 56 in the first lattice of reinforcing material, and above the plurality of openings 64 in the die. Finally, the pusher 60 is positioned above the die, the lattice of reinforcing material, the cut sheet of resilient material, and the pusher is aligned so that the plurality of push elements are aligned with and oriented towards the plurality of resilient elements 138.

As shown in FIG. 25, the pusher 60 is then lowered until the plurality of push elements 68 engage with the plurality of resilient elements 138, whereby the resilient elements are pushed out of the excess resilient material 40 to a position where they are partially in the plurality of holes 56 in the first lattice of reinforcing material 52 and partially in the plurality of openings 64 in the die 58. As such, the cut portions of the plurality of resilient elements are at least partially surrounded by the first lattice of reinforcing material.

As shown in FIG. 26, the excess resilient material 40 is removed from the die and discarded. The remaining plurality of resilient elements 138 and the lattice of reinforcing material 52 have now been assembled to form a resilient material assembly 70, where the first sides 116 of the plurality of resilient elements define a first side 72 of the resilient material assembly, and the second sides of the plurality of resilient elements 118 define a second side of the resilient material 74 assembly opposite the first side of the resilient material assembly. As shown in FIG. 27, the resilient material assembly 70 is then removed from the die 58 so that it can be used as a substrate for forming various composite materials.

FIGS. 28-44 show various additional processes for forming composite materials starting from the resilient material assembly 70, which as discussed above, includes the plurality of resilient elements 138 and the first lattice of reinforcing material 52. The steps shown in FIGS. 28-44 show the process for forming composite materials from resilient material assembly 70 where the resilient elements 138 have a heat-activated adhesive bonded to their surfaces. It is understood that similar method steps could be used to assemble substantially similar composite materials from a resilient material assembly 70 where the resilient elements 138 have a different type of adhesive bonded to their opposing surfaces, but such method steps would not require the application of heat to bond the various elements of the composite materials together.

As shown in FIG. 28, the resilient material assembly is placed on a surface beneath a heat platen 76. A first sheet of fabric or mesh material 78 is placed onto the first side 72 of the resilient material assembly so that the first fabric or mesh sheet contacts the first sides 116 of the plurality of resilient elements. As shown in FIG. 29, the heat platen is lowered until it contacts the first fabric or mesh sheet, and is then heated, thereby heating the first fabric or mesh material and the first side of the resilient material assembly. This activates the adhesive on the first sides of the plurality of resilient elements, whereby the first fabric or mesh material is adhered to the first side of the resilient material assembly to form a first composite material 80. As shown in FIG. 30, the first composite material is then removed from the heat platen for further processing. Alternatively or additionally, the first composite material shown in FIG. 30 can be used as a protective pad without further processing.

It should be understood that the first lattice of reinforcing material 52 in the first composite material 80 is not adhered or otherwise permanently secured to the plurality of resilient elements 138. As such, the first lattice of reinforcing material can be easily removed from the plurality of resilient elements, as shown in FIG. 31, to form a second composite material 82 having the first fabric or mesh sheet 78 adhered to the first sides of the plurality of resilient elements, but lacking a reinforcement lattice altogether. After the first lattice of reinforcing material has been removed from the plurality of resilient elements to form the second composite material, the first fabric or mesh sheet substantially retains the plurality of resilient elements in a predetermined pattern. Alternatively, if a sheet of reinforcing material is cut with a cutter with multiple perimetral cutting edges, the excess material outside the desired defined area may be removed from the sheet of reinforcing material, leaving a "partial cage", resulting in the fourth composite material.

The second composite material 82 can be used as a substrate to make yet other composite materials. For example, as shown in FIGS. 32-34, the second composite material 82 can be used to make a third composite material 84 comprising the plurality of resilient elements 138 sandwiched on opposite sides by the first fabric or mesh sheet 78 and a second fabric or mesh sheet 86, but lacking a reinforcement lattice altogether. To make this third composite material, the second composite material 82 is placed beneath the heat platen 76 with the first sides of the resilient elements 116 and the first fabric or mesh sheet 78 facing away from the heat platen, and the second sides of the resilient elements 118 facing the heat platen. A second fabric or mesh sheet 86 is then placed onto the second side of the resilient elements, and is heated with the heat platen to activate the adhesive on the second sides of the plurality of resilient elements, whereby the second fabric or mesh sheet adheres to the second sides of the plurality of resilient elements to form the third composite material 84. Because the first lattice of reinforcing material was removed from the plurality of resilient elements prior to adhering the second fabric or mesh sheet to the resilient elements, this third composite material lacks a reinforcement lattice altogether. The third composite material may be used as a protective pad.

As shown in FIGS. 35-38, the second composite material 82 can also be used to make a fourth composite material 88 comprising the plurality of resilient elements 138 sandwiched between a pair of fabric or mesh sheets 78 and 86, and one or more lattices of reinforcing material 90 that each surround only a subset of the plurality of resilient elements. In such cases, the first lattice of reinforcing material 52 that was removed from the first composite material 80 (see FIGS. 30-31) can be cut to a smaller desired shape to form a second lattice of reinforcing material 90 that will only surround a subset of the plurality of resilient elements. Alternatively or additionally, one or more lattices of reinforcing material 90 smaller than the first lattice of reinforcing material 52 can be made from scratch according to the general steps for cutting a lattice of reinforcing material described above. As shown in FIGS. 35-36, one or more of these smaller lattices of reinforcing material 90 can be pressed onto a desired subset of the plurality of resilient elements 138 so that only portions of the plurality of resilient elements are reinforced by a lattice or lattices of reinforcing material. As shown in FIGS. 36-38, after pressing the smaller lattice of reinforcing material onto the desired subset of resilient elements, a heat platen 76 can be used to adhere a second fabric or mesh sheet 86 to the second sides 118 of the resilient elements to form the fourth composite material 88.

The first composite material 80 shown in FIG. 30 also can be used as a substrate to make other composite materials. For example, as shown in FIGS. 39-41, the first composite material 80 can be used to make a fifth composite material 92 comprising the plurality of resilient elements 138 sandwiched on opposite sides by fabric or mesh sheets 78 and 86, and surrounded by the first lattice of reinforcing material 52. To make this fifth composite material, the first composite material is placed beneath the heat platen with the first sides of the resilient elements 116 and the first fabric or mesh sheet 78 facing away from the heat platen 76, and the second sides of the resilient elements facing the heat platen. A second fabric or mesh sheet 86 is then placed onto the second side 118 of the resilient elements, and is heated with the heat platen to activate the adhesive on the second sides of the plurality of resilient elements, whereby the second fabric or mesh material adheres to the second sides of the plurality of resilient elements to form the fifth composite material 92. Because the first reinforcement lattice 52 was never removed from the plurality of resilient elements 138 prior to adhering the second fabric or mesh sheet to the resilient elements, this fifth composite material includes a reinforcement lattice that fully surrounds the plurality of resilient elements.

As shown in FIGS. 42-44, the first composite material 80 also can be used to make a sixth composite material 94 comprising the plurality of resilient elements 138 sandwiched on opposite sides by fabric or mesh sheets 78, 86, where all of the resilient elements are surrounded by the first lattice of reinforcing material 52, and one or more subsets of the resilient elements are surrounded by one or more second smaller lattices of reinforcing material 90. To make this sixth composite material, one or more lattices of reinforcing material 90 that are smaller than the first excess resilient material 52 can be made from scratch according to the general steps discussed above or a piece taken from an existing lattice, which may be pre-designed to be broken off. The smaller lattice(s) of reinforcing material then can be pressed onto any desired subset(s) of resilient elements 138 so that each smaller lattice only surrounds that subset. After pressing the smaller lattice(s) of reinforcing material onto the desired subset(s) of resilient elements, a heat platen 76 can be used to adhere a second fabric or mesh sheet 86 to the sides of the resilient elements opposite to the side adhered to the first fabric or mesh sheet 78 in the manner discussed above. This forms the sixth composite material 94, which can be used as a protective pad.

In another embodiment, a layer of mesh or fabric or any other suitable material may be placed in the die so that when the resilient elements are pushed through with a pusher 60, the resilient elements contact and bind directly to the mesh or fabric or any other suitable material.

A Second Process for Making the Resilient Composite Pad

An alternative process for making various composite pads with no reinforcement, partial reinforcement, full reinforcement, and both partial and full reinforcement generally comprises:

(a) providing a sheet of resilient material having opposing sides;

(b) applying an adhesive to either or both sides of the sheet of resilient material;

(c) providing a first cutter having a surface and a plurality of cutting elements extending from the surface in a predetermined pattern, where each cutting element has a shape defining an internal space, wherein the plurality of cutting elements are spaced apart from one another to define a contiguous space surrounding and between the plurality of cutting elements, and the internal spaces and the contiguous space are filled with biasing material;

(d) pressing the first cutter into the sheet of resilient material, thereby forming a cut sheet of resilient material comprising a plurality of resilient elements and excess resilient material, wherein each resilient element has a shape corresponding to the shape of the internal space of its corresponding cutting element, the plurality of resilient elements form a pattern corresponding to the predetermined pattern of the plurality of cutting elements, and the excess resilient material has a shape corresponding to the shape of the contiguous space;

(e) withdrawing the first cutter from the cut sheet of resilient material, whereby the biasing material urges the plurality of resilient elements and the excess resilient material away from the internal spaces within and the contiguous space surrounding the plurality of cutting elements, thereby leaving the cut sheet of resilient material with the cut portions of the resilient elements surrounded by the excess resilient material;

(f) providing a sheet of reinforcing material, which may be optionally processed using the following methods however, the methods of processing a reinforcement lattice is not limited to carrying out the following steps, so long as at least one reinforcement lattice is obtained so as to be combinable with the resilient elements to form the inventive composite pad;

(g) pressing a second cutter into the sheet of reinforcing material, thereby forming a cut sheet of reinforcing material comprising a plurality of reinforcing elements and a lattice of reinforcing material, wherein each reinforcing element has a size and shape corresponding to the predetermined size and shape of the cutting elements, the plurality of reinforcing elements form a pattern corresponding to the predetermined pattern of the plurality of cutting elements, and the lattice of reinforcing material has a shape corresponding to the shape of the contiguous space;

(h) withdrawing the second cutter from the cut sheet of reinforcing material, whereby if the biasing material is optionally used, the biasing material urges the plurality of reinforcing elements and the lattice of reinforcing material away from the internal spaces within and the contiguous space surrounding the plurality of cutting elements, and thereby leaves the cut sheet of reinforcing material with the cut portions of the reinforcing elements optionally surrounded by the lattice of reinforcing material;

(i) separating the lattice of reinforcing material from the reinforcing elements, whereby the lattice of reinforcing material is left with a plurality of holes through the reinforcing material where the reinforcing elements used to be;

(j) removing adhesive layer from the excess resilient material on the first side of the cut sheet of resilient material, leaving adhesive on the resilient elements;

(k) bonding a first substrate such as a fabric or mesh to the first side of the cut sheet of resilient material resulting in bonding between the resilient elements to the first substrate optionally by contacting the resilient material with a heat platen, if heat-activated adhesive material was applied to the first side of the resilient material;

(l) separating the excess resilient material from the cut sheet of resilient material, leaving the plurality of resilient elements bound to the first substrate;

(m) engaging the holes of the lattice of reinforcing material to the plurality of resilient elements to form the composite material;

(n) placing a second substrate such as a sheet of fabric or mesh material or any other suitable material onto the second side of the resilient material so that the plurality of resilient elements on the second side of the resilient material bond to the second substrate; and (o) heating the second fabric or mesh sheet substrate or any other suitable material with a heat platen to activate the adhesive on the plurality of resilient elements on the second side of the resilient material, whereby the second fabric or mesh material or any other suitable material adheres to the plurality of resilient elements to form a composite material, if heat-activated adhesive material was applied to the second side of the resilient material.

It is to be understood that the adhesive material used need not be limited to heat-activatable type. Other types of adhesives that may be used including without limitation, heat-activated adhesive laminate, two-sided adhesives with removable backing, or the like.

Suitable material for the substrate to which the plurality of resilient elements are adhered may include without limitation, natural or synthetic fabric, mesh, flexible or pliable plastic, latex, silicone, or other rubber material, or made of synthetic fiber.

As will be appreciated from the description of the preferred embodiments below, this general process may be used to form various composite materials, including but not limited to composite pads with no reinforcement, partial reinforcement, full reinforcement, and both partial and full reinforcement of the resilient elements by reinforcing material.

It should also be understood that the adhesive layer may be applied to one or both sides of the cut sheet of resilient material. The reinforcing material, including the lattice portion, may also be optionally coated with an adhesive layer on either one or both sides if a permanent bonding between the lattice of reinforcing material and the first substrate is desired.

It is also contemplated that in the scheme of things, the resilient material may be composed of different types of material or color, which may be secured to a single continuous lattice of reinforcing material. Conversely, several lattices of reinforcing material may be used to secure a resilient material of a single continuous material. Also, several types of resilient material may be linked together and assembled with several different types of lattices of reinforcing material.

The cutting of the resilient material is described above. However, for purposes of usage in the second process for making the resilient composite pad the resilient elements are not to be "pushed out" in a die.

The lattice of reinforcing material may be made as described above for use in the second process for making the resilient composite pad. Alternatively, the lattice of reinforcing material may be made by simply cutting a resilient material with a cutter.

Assembling Pad Composite without the Need for Use of a Die

After forming the cut sheet of resilient material 136 (including the plurality of resilient elements 138 and the excess resilient material 40), and the first lattice of reinforcing material 52, the plurality of resilient elements 138 are bonded to the first fabric or mesh sheet "substrate" 78. The excess resilient material is removed. Then, the first lattice of reinforcing material is assembled with the plurality of resilient elements to form a resilient material assembly by fitting the first lattice of reinforcing material 52 on to the group of resilient elements, according to the process shown in FIGS. 46-49 and 62-68. As shown in FIG. 14, the cut resilient material includes a first side 116 and second side 118. At least one of the surfaces is coated with an adhesive.

Figure 45:
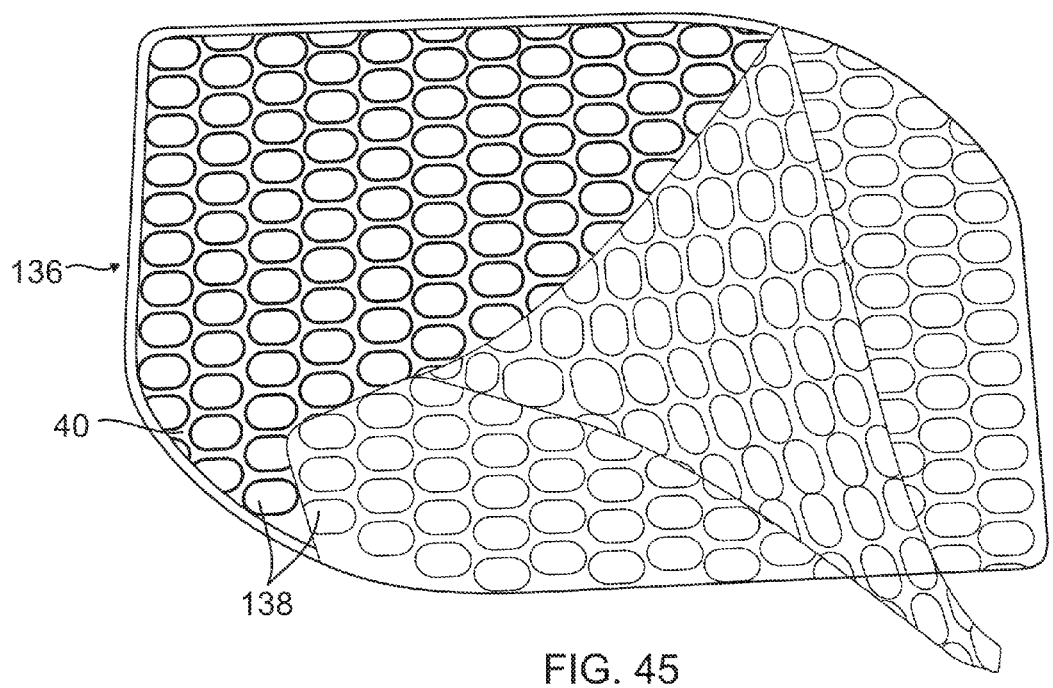
FIG. 45 depicts the "peeling off" or removal of the adhesive layer from the excess resilient material portion of the resilient material.
Figure 60:
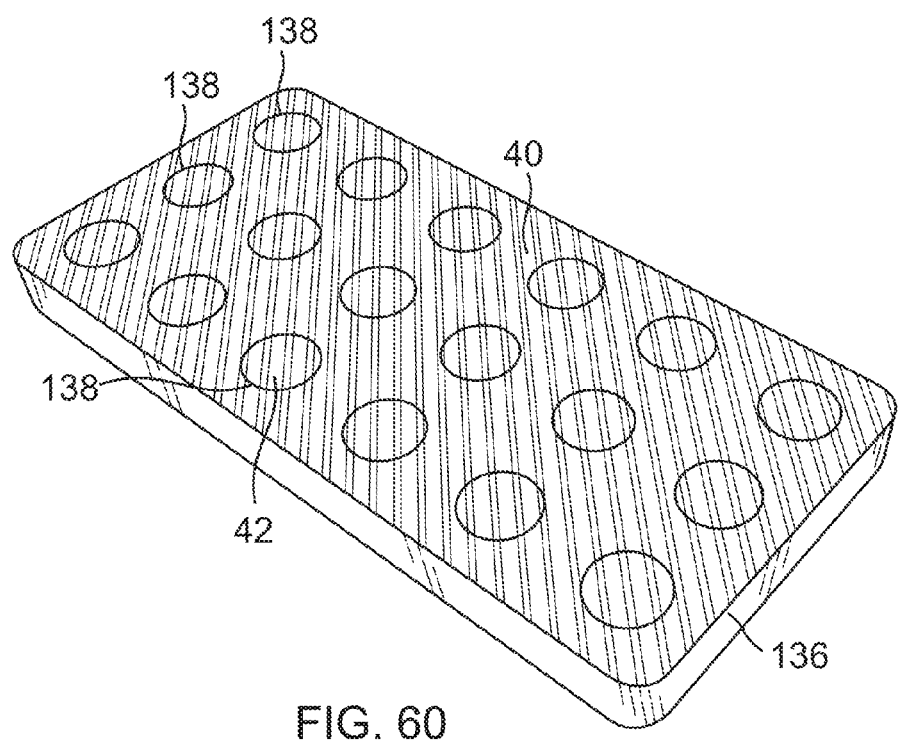
FIG. 60 is perspective view of a sheet of cut resilient material coated with an adhesive on its first side.
Figure 61:
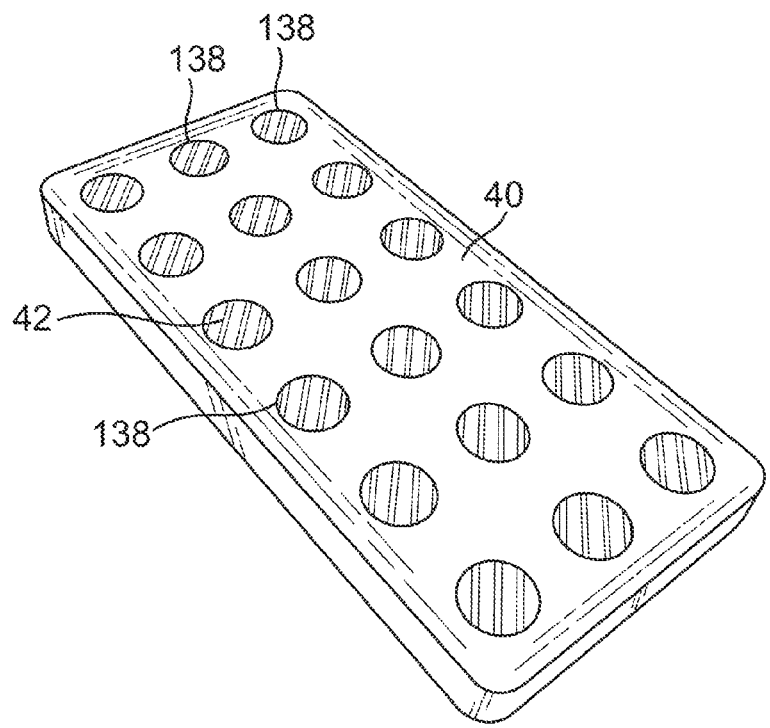
FIG. 61 is perspective view of a sheet of cut resilient material coated with an adhesive on its first side only on the resilient elements.

In one embodiment of the invention, the adhesive on the excess resilient material is removed. The removal may be carried out in a variety of ways. In one aspect, the adhesive layer coating the excess resilient material may be "pulled off" of the resilient material leaving behind the adhesive layer bound only on the resilient element. This procedure results in the resilient elements 138 being coated with adhesive and the excess resilient material 40 not being coated with adhesive on the first side 116 of the cut resilient material. This is illustrated in FIGS. 45 and 60-61. In a specific embodiment of the invention, the resilient material is pre-coated with a heat activated adhesive such as hot melt adhesive or film appropriate for EVA (ethylene vinyl acetate) or similar type of plastic, foam or rubber.

To elaborate further on the desirability of ultimately bonding only the resilient element portion of the cut sheet of resilient material to the first substrate, FIGS. 45 and 60-61 show an exemplified method as illustrated, of coating the entire resilient material with adhesive before cutting the resilient material, and then physically pulling off or chemically dissolving the adhesive material bound only to the excess resilient material portion, leaving behind adhesive material on the resilient elements, which is bonded to the first substrate.

Other methods to selectively coat the resilient elements may include without limitation, using masks to activate or directly apply the adhesive only on the resilient elements. For instance, adhesive may be applied only to the resilient elements 138 by the use of a mask that covers the excess resilient material 40 so as to apply the adhesive material selectively, rather than to the entire surface of the resilient material. This would save on the cost of adhesives. The adhesive may be applied to a cut sheet of resilient material, or alternatively, to a pre-cut but pre-marked sheet of resilient material.

Alternatively, chemically treated masks may also be used to deactivate or remove or "etch out" the adhesive on the excess resilient material. Or, the excess resilient material portion coated with adhesive may be "covered" prior to contacting the first substrate to the resilient elements in order to prevent adhesion of the excess resilient material to the substrate. For example, a sheet of wax paper with holes cut out to accommodate the resilient elements may be aligned. Such "blocking" paper may sit between the resilient material and the substrate during lamination, and prevent the excess resilient material from adhering to the substrate.

A first substrate 78 such as a fabric or mesh is contacted with the first side 116 of the cut resilient material in particular the adhesive coated resilient elements 138, and the bonding between the resilient elements 138 and the substrate 78 is allowed to occur. Once the bonding has occurred, the excess resilient material 40 is removed from the resilient material, leaving the resilient elements 138 of the first side 116 bonded to the first substrate 78, and the second side of the resilient elements 44 optionally coated with an adhesive. This composite assembly is referred to herein as the second composite material 302 (FIGS. 45-48 and 62-63).

Figure 67:
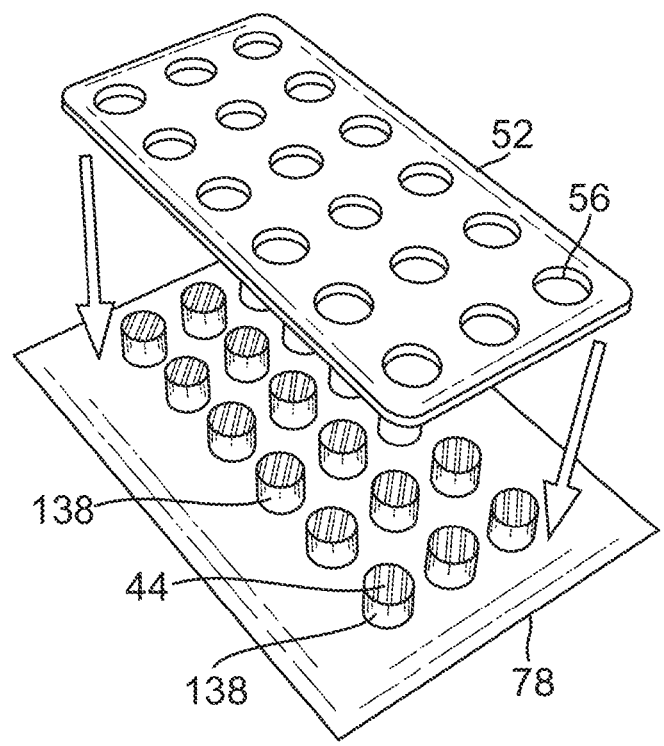
FIG. 67 is perspective view of the second composite material and a full lattice of reinforcing material being fitted together
Figure 68:
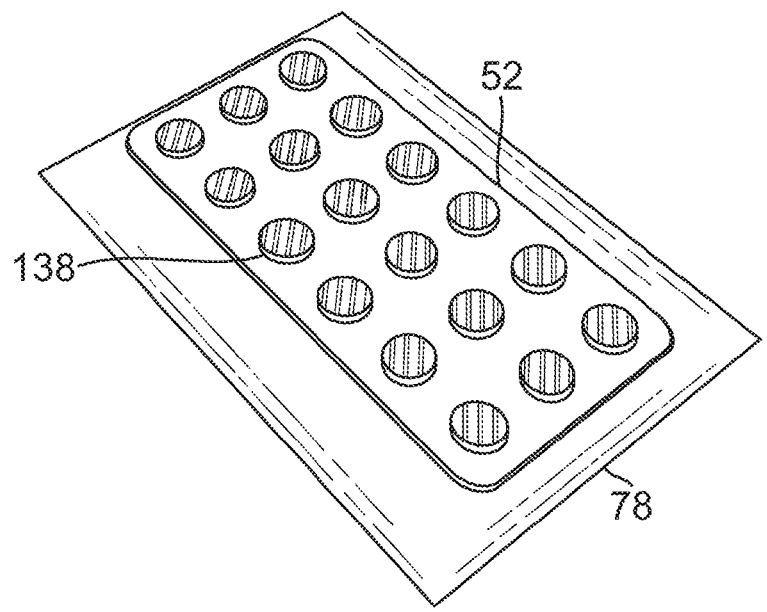
FIG. 68 is perspective view of a full lattice of reinforcing material fit on to the second composite material.
Figure 69:
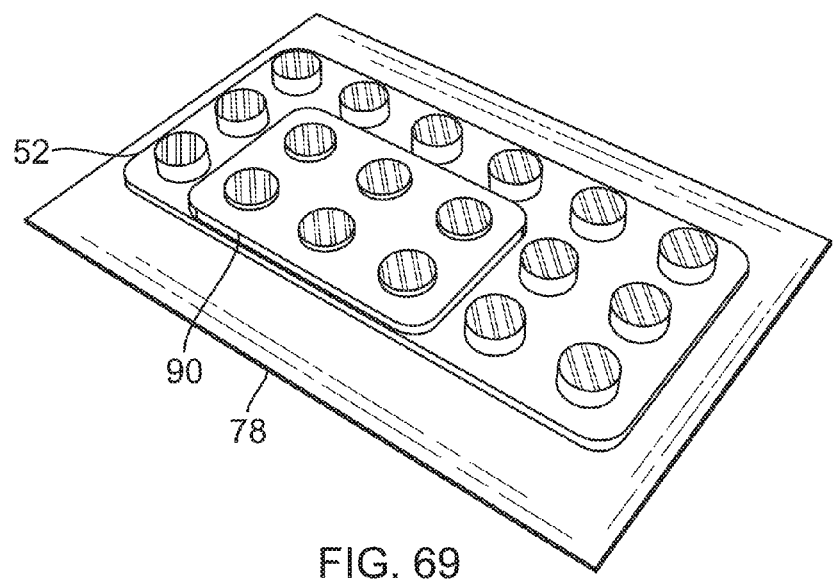
FIG. 69 is perspective view of full and partial lattices of reinforcing material fit on to the second composite material.
Figure 70:
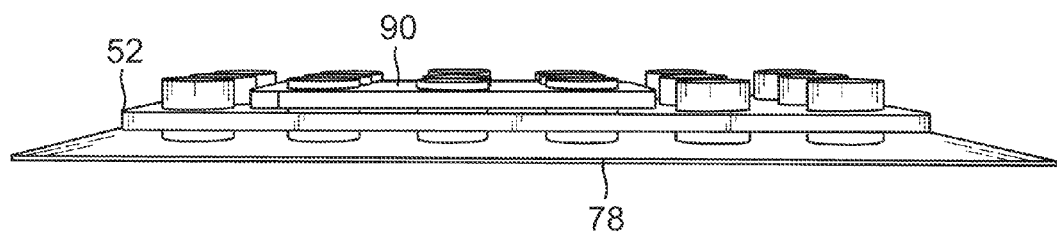
FIG. 70 is side/perspective view of a full and partial lattice of reinforcing material fit on to the second composite material.

In one aspect of the invention, the plurality of resilient elements 138 bonded to the first substrate 78 is aligned with the first lattice of reinforcing material 52 so that the plurality of resilient elements 138 are positioned in alignment with the plurality of holes 56 in the first lattice of reinforcing material 52 (FIGS. 49 and 67-68). In another aspect, the plurality of resilient elements 138 are forced to a position where they are at least partially in the plurality of holes 56 in the first lattice of reinforcing material 52. As such, the plurality of resilient elements are at least partially surrounded by the first lattice of reinforcing material.

Alternatively and additionally, the plurality of resilient elements 138 bonded to the first substrate 78 may be aligned with a second lattice of reinforcing material 90 so that the second lattice of reinforcing material surrounds only a subset of the plurality of resilient elements (FIGS. 53 and 64-70).

Figure 71:
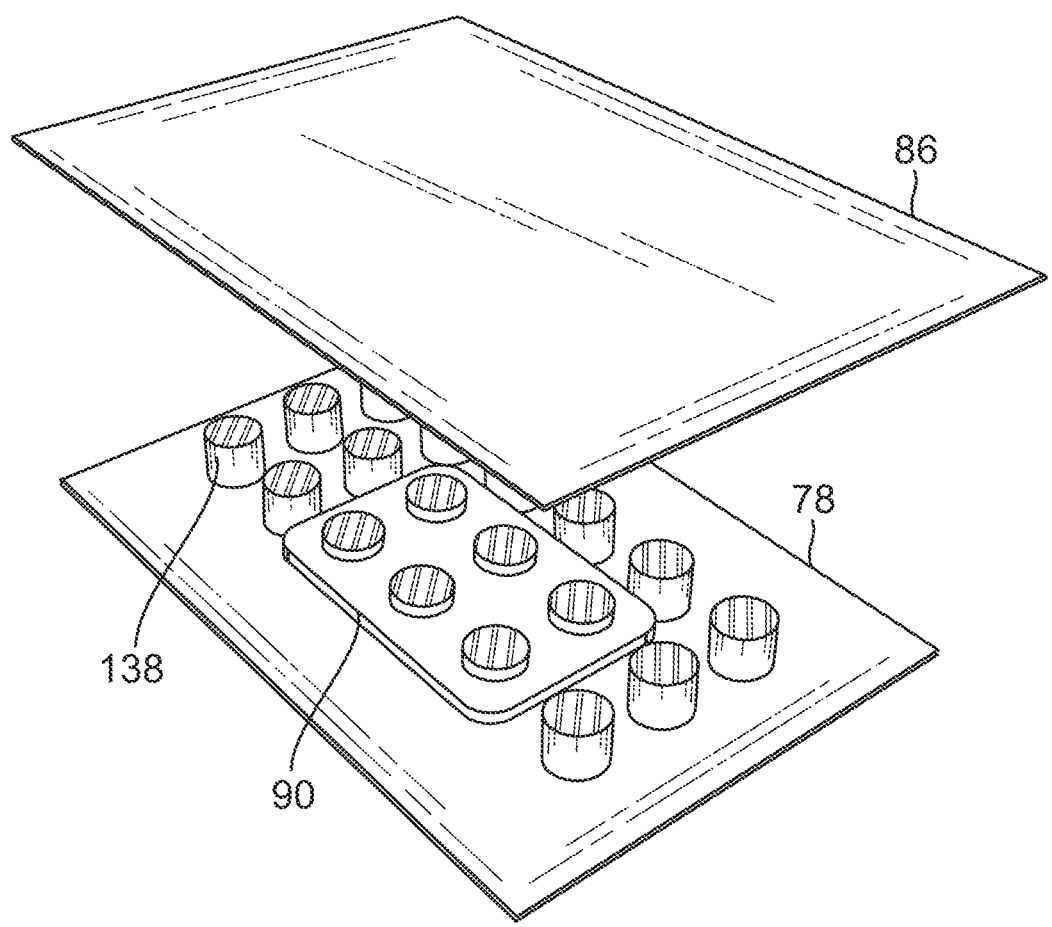
FIG. 71 is perspective view of the formation of fourth composite by adhering a cloth or mesh material to the second side of the resilient elements, in which the resilient elements and the lattice of reinforcing material are sandwiched between the cloth or mesh material layers.

The plurality of resilient elements 138 and the lattice of reinforcing material 52 have now been assembled to form a resilient material assembly, where a first side of the plurality of the resilient elements 42, coated with adhesive is bonded to the first substrate and the second side of the plurality of resilient elements 44 defines a second side of the resilient material opposite the first side of the resilient material assembly (FIG. 68). The plurality of resilient elements on the second side 44 may be bonded to a second substrate opposite the first side of the resilient material assembly (FIGS. 56, 59 and 71).

Assembly of Composite Using the Second Process for Making the Resilient Composite Pad Material in Greater Detail FIGS. 46-59 show processes for forming composite materials in greater detail. The steps shown in FIGS. 46-59 show the process for forming composite materials where the resilient elements 138 have a heat-activated adhesive bonded to their surfaces. It is understood that similar adhesive may be used to assemble similar composite materials where the resilient elements 138 are coated with a type of adhesive that would not require the application of heat to bond the various elements to a substrate.

As shown in FIG. 46, the cut sheet of resilient material 136, in which only the resilient elements 138 are coated with adhesive on the first side of the resilient material 116 are placed on a surface next to a heat platen 76. A first substrate or sheet of fabric or mesh material 78 is placed onto the first side of the resilient material 116 so that the first substrate of fabric or mesh sheet contacts the first side of the plurality of resilient elements 42 coated with adhesive. It is noted that the excess resilient material 40 is not coated with adhesive as described above or may be coated but may be covered with a material that prevents the excess material portion from contacting or bonding to the substrate 78. As shown in FIG. 47, a heat platen is moved towards the first substrate of fabric or mesh sheet 78, until it contacts the first substrate of fabric or mesh sheet, and is then heated, or alternatively and optionally the heat platen is pre-heated before it contacts the substrate of fabric or mesh sheet, thereby heating the first substrate of fabric or mesh material and the first side of the resilient material 116. This activates the adhesive on the first side of the plurality of resilient elements 42, whereby the first substrate of fabric or mesh material is adhered to the first side of the resilient material 116 to form a resilient material/substrate composite material 300 (FIG. 47).

Figure 62:
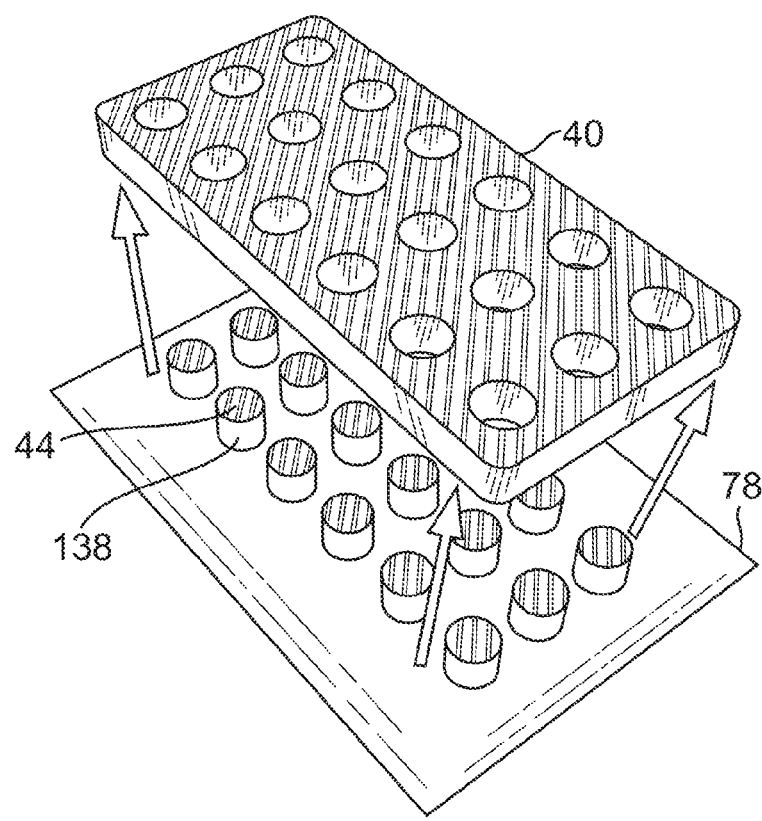
FIG. 62 is perspective view of the formation of the second composite material in which the first side of the resilient elements is adhered to the cloth or mesh material and the excess resilient material is removed.
Figure 63:
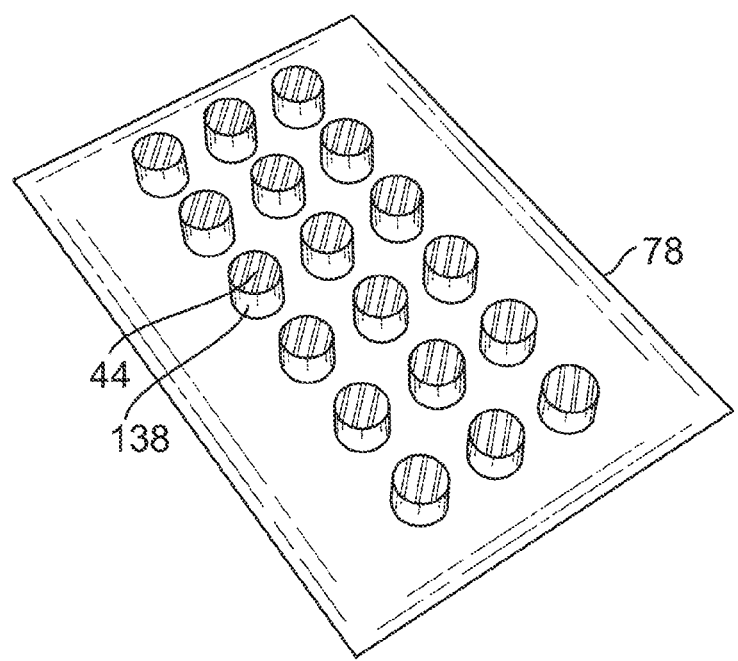
FIG. 63 is perspective view of the second composite material.
Figure 64:
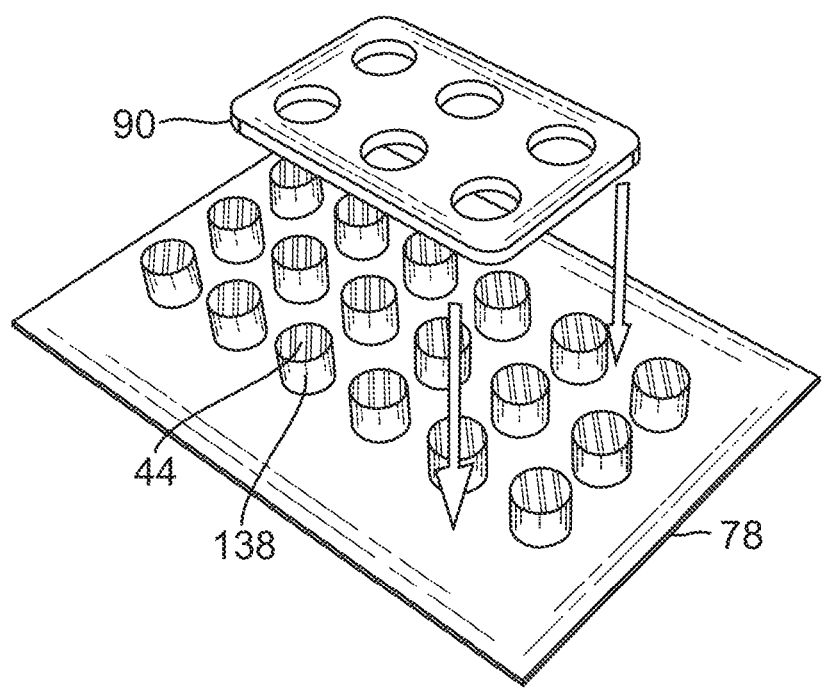
FIG. 64 is perspective view of the second composite material and a partial lattice of reinforcing material being fitted together.
Figure 65:
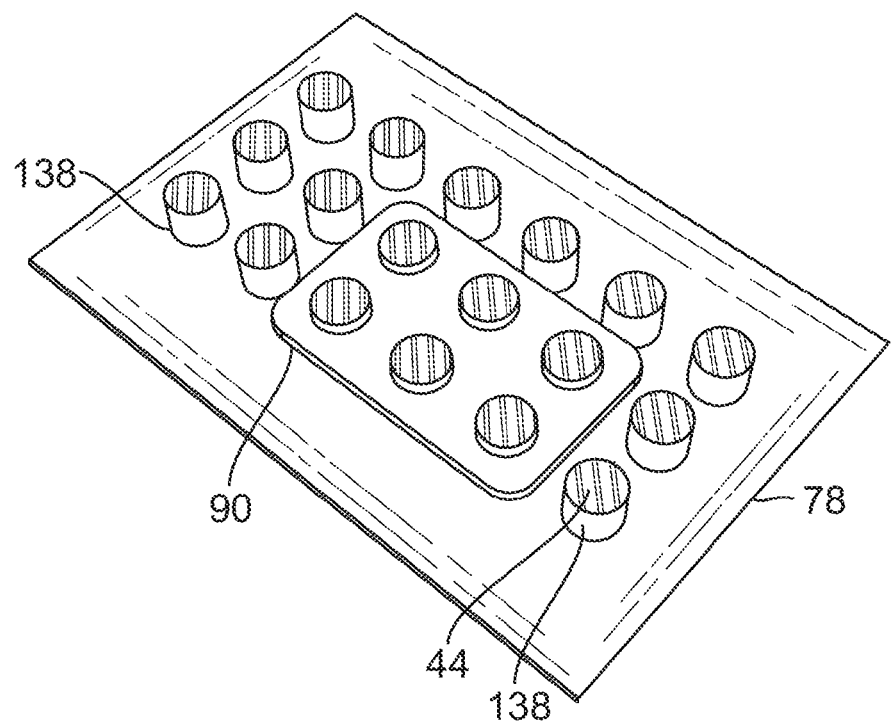
FIG. 65 is perspective view of a partial lattice of reinforcing material fit on to the second composite material.
Figure 66:
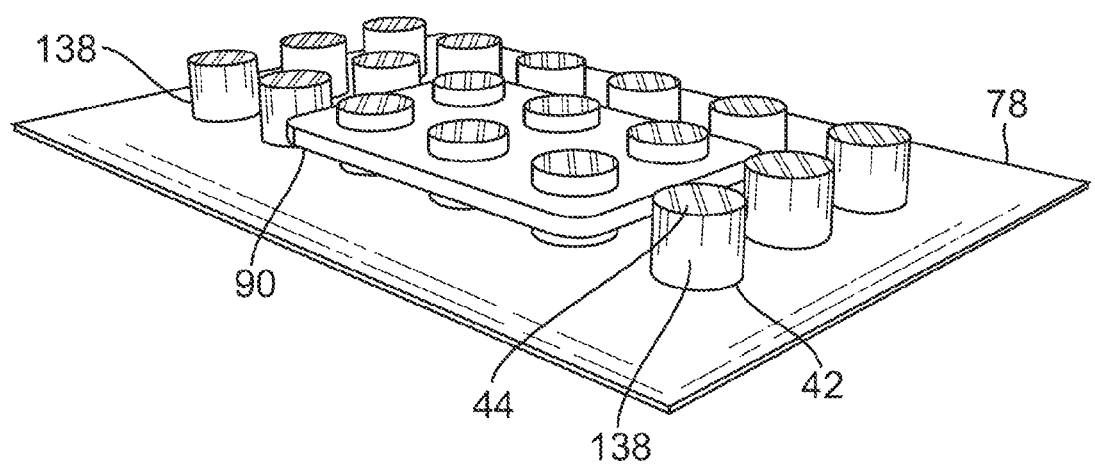
FIG. 66 is side/perspective view of a partial lattice of reinforcing material fit on to the second composite material.

As shown in FIG. 48, the resilient material/substrate composite material 300 is then removed from the heat platen for further processing. As shown in FIGS. 48 and 62, the excess resilient material 40 is removed from the resilient material/substrate composite material 300 resulting in a second composite material 302, which includes a substrate bonded to resilient elements. Alternatively or additionally, the second composite material 302 shown in FIGS. 48 and 63 can be used as a protective pad without further processing.

Alternatively or additionally, the holes of a first reinforcement lattice are aligned to the plurality of resilient elements 138 and are secured or engaged to result in the first composite material 301 (FIGS. 49 and 67-68).

Alternatively or additionally, after the holes of a first reinforcement lattice are aligned to the plurality of resilient elements 138 and are inserted or engaged, the reinforcement lattice may be optionally glued to the first substrate, resulting in a type of composite material that can be used as a protective pad without further processing.

However, it should be understood that the first lattice of reinforcing material 52 in the first composite material 301 is preferably not adhered or otherwise permanently secured to the plurality of resilient elements 138. As such, the first lattice of reinforcing material may be loosely inserted, secured, engaged or fitted to the plurality of resilient elements.

The second composite material 302 can be used to make yet other composite materials. For example, as shown in FIGS. 50-52, the second composite material 302 can be used to make a third composite material 303 comprising the plurality of resilient elements 138 sandwiched on opposite sides by the first fabric or mesh sheet substrate 78 and a second fabric or mesh sheet substrate 86, but lacking a lattice of reinforcing material. To make this third composite material, the second composite material 302 is placed next to the heat platen 76 with the first sides of the resilient elements 42 and the first fabric or mesh sheet 78 facing away from the heat platen, and the second sides of the resilient elements 44 facing the heat platen. A second fabric or mesh sheet substrate 86 is then placed onto the second side of the resilient elements, and is heated with the heat platen to activate the adhesive on the second sides of the plurality of resilient elements, whereby the second fabric or mesh sheet adheres to the second sides of the plurality of resilient elements to form the third composite material 303, which lacks excess resilient material or reinforcing material. This third composite material type also may be used as a protective pad without further processing.

As shown in FIGS. 53-56 and 64-66, the second composite material 302 can also be used to make a fourth composite material 304 comprising the plurality of resilient elements 138 sandwiched between a pair of fabric or mesh sheet substrates 78 and 86, and one or more lattices of reinforcing material 90 that surround only a subset of the plurality of resilient elements. In such cases, the first lattice of reinforcing material can be cut to a smaller desired shape to form a second lattice of reinforcing material 90 that will only surround a subset of the plurality of resilient elements. Alternatively or additionally, one or more lattices of reinforcing material 90 smaller than the first lattice of reinforcing material 52 can be made from scratch according to the general steps for cutting a lattice of reinforcing material described above. As shown in FIGS. 53-54 and 64-66, one or more of these smaller lattices of reinforcing material 90 can be pressed onto a desired subset of the plurality of resilient elements 138 so that only portions of the plurality of resilient elements are reinforced by a lattice or lattices of reinforcing material. As shown in FIGS. 53-56, 64-66 and 71, after pressing the smaller lattice of reinforcing material onto the desired subset of resilient elements, a heat platen 76 can be used to adhere a second fabric or mesh sheet substrate 86 to the second sides 118 of the resilient elements to form the fourth composite material 304.

As shown in FIGS. 57-59, 69 and 70, the first composite material 301 also can be used to make a sixth composite material 306 comprising the plurality of resilient elements 138 sandwiched on opposite sides by fabric or mesh sheet substrates 78, 86, where all of the resilient elements are surrounded by the first lattice of reinforcing material 52, and one or more subsets of the resilient elements are surrounded by one or more second smaller lattices of reinforcing material 90. To make this sixth composite, one or more lattices of reinforcing material 90 that are smaller than the first lattice of reinforcing material 52 can be made from scratch according to the general steps discussed above. The smaller lattice(s) of reinforcing material then can be pressed onto any desired subset(s) of resilient elements 138 so that each smaller lattice only surrounds that subset. After pressing the smaller lattice(s) of reinforcing material onto the desired subset(s) of resilient elements, a heat platen 76 can be used to adhere a second fabric or mesh sheet substrate 86 to the sides of the resilient elements opposite the side adhered to the first fabric or mesh sheet substrate 78 in the manner discussed above. This forms the sixth composite material 306, which can be used as a protective pad. Moreover, multiple smaller lattices of reinforcing material may be layered on to subsets of resilient elements.

In another aspect of the invention, the fabric or mesh sheets 78 and/or 86 may be natural or synthetic fibers. Alternatively, the sheeting structure may be flexible or pliable plastic, or latex, silicone, or other rubber material, or made of synthetic fiber.

The various components of the process disclosed herein may be made of any suitable material and may be any size and shape consistent with their functions. The specific embodiments of the process disclosed and illustrated herein are not to be considered in a limiting sense as numerous variations are possible. Ordinal indicators, such as first, second or third, for identified elements in the specification or the claims are used to distinguish between the elements, and do not indicate a required or limited number of such elements, and do not indicate a particular position or order of such elements unless otherwise specifically indicated. The subject matter of this disclosure includes all novel and non-obvious combinations and subcombinations of the various features, elements, functions and/or properties disclosed herein. No single feature, function, element or property of the disclosed embodiments is essential.

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims. The following examples are offered by way of illustration of the present invention, and not by way of limitation.

Those skilled in the art will recognize, or be able to ascertain using no more than routine experimentation, many equivalents to the specific embodiments of the invention specifically described herein. Such equivalents are intended to be encompassed in the scope of the claims.

What is claimed is:

1. A method of making a composite structure for use as a resilient cushion comprising:
   (a) providing a sheet of resilient material having opposing sides of a first side and a second side;
   (b) applying an adhesive to the first side and optionally the second side of the sheet of resilient material;
   (c) providing a cutter having a surface and a plurality of cutting elements extending from the surface in a predetermined pattern;
   (d) pressing the cutter into the sheet of resilient material, thereby forming a cut sheet of resilient material comprising a plurality of discrete, spaced-apart, resilient elements and excess resilient material;
   (e) withdrawing the cutter from the cut sheet of resilient material;
   (f) either removing the adhesive from the excess resilient material on the first side of the cut sheet of resilient material, leaving adhesive on the plurality of discrete, spaced-apart, resilient elements, or blocking a portion of the adhesive on the excess resilient material, then;
   (g) bonding a first substrate to the first side of the cut sheet of resilient material resulting in bonding of the plurality of discrete, spaced-apart, resilient elements to the first substrate; and then (h) separating the excess resilient material from the cut sheet of resilient material, leaving the plurality of discrete, spaced-apart, resilient elements bound to the first substrate, forming a resilient material assembly.

2. The method according to claim 1, comprising
   (i) placing a second substrate onto the second side of the resilient material assembly; and
   (j) heating the second substrate with a heat platen to activate the adhesive on the plurality of resilient elements on the second side, whereby the second substrate adheres to the plurality of discrete, spaced-apart, resilient elements on the second side.

3. The method according to claim 1, comprising:
   (i) providing a sheet of reinforcing material;
   (j) pressing the cutter into the sheet of reinforcing material, thereby forming a cut sheet of reinforcing material comprising a plurality of reinforcing elements and at least one partial or full lattice of reinforcing material;
   (k) withdrawing the cutter from the cut sheet of reinforcing material;
   (l) separating the lattice of reinforcing material from the reinforcing elements, whereby the lattice of reinforcing material is left with a plurality of holes through the reinforcing material where the reinforcing elements used to be;
   (m) engaging at least one partial or full lattice of reinforcing material to the resilient elements in (h).

4. The method according to claim 3, comprising:
   (n) placing a second substrate onto the second side of the resilient material assembly; and
   (o) heating the second substrate with a heat platen to activate the adhesive on the plurality of resilient elements on the second side, whereby the second substrate adheres to the plurality of discrete, spaced-apart, resilient elements to form the composite material, wherein the at least one partial or full lattice of reinforcing material is positioned between the first and second sheets of the substrate.

5. The method according to claim 1, comprising making the composite structure for use as a resilient cushion without a die.

6. The method according to claim 1, wherein in step (f), the removing of the adhesive is carried out by peeling off the adhesive layer, chemically dissolving the adhesive material bound only to the excess resilient material, treating the adhesive on the excess resilient material with chemically treated masks; or wherein the blocking of the portion of the adhesive on the excess resilient material is carried out with paper or material that does not bond to the adhesive.

7. The method according to claim 6, wherein the removing adhesive layer step is carried out by peeling off the adhesive layer.

8. The method according to claim 3, wherein height of the lattice of reinforcing material is relatively higher, lower or equal compared to height of the resilient elements.

9. The method according to claim 8, wherein the height of the lattice of reinforcing material is relatively lower compared to the height of the resilient elements.

10. The method according to claim 1, wherein the substrate is sheet of fabric or mesh.

11. The method according to claim 1, comprising:
(i) placing a second substrate onto the second side of the resilient material assembly; and
(j) bonding the second substrate to the second side of the plurality of resilient elements, whereby the second substrate adheres to the plurality of discrete, spaced-apart, resilient elements on the second side.

12. The method according to claim 3, comprising:
(n) placing a second substrate onto the second side of the resilient material assembly; and
(o) bonding the second substrate to the second side of the plurality of resilient elements, whereby the second substrate adheres to the plurality of discrete, spaced-apart, resilient elements on the second side.

13. The method according to claim 1, wherein the first substrate is fabric or mesh.

14. The method according to claim 2, wherein the second substrate is fabric or mesh.

15. The method according to claim 4, wherein the second substrate is fabric or mesh.

16. The method according to claim 11, wherein the second substrate is fabric or mesh.

17. The method according to claim 12, wherein the second substrate is fabric or mesh.

* * * * *